United States Patent
Takato et al.

(10) Patent No.: US 11,261,044 B2
(45) Date of Patent: Mar. 1, 2022

(54) MEDIUM CONVEYING APPARATUS FOR MOVING AN IMAGING DEVICE IN CONJUNCTION WITH A THICKNESS OF A MEDIUM

(71) Applicant: PFU LIMITED, Kahoku (JP)

(72) Inventors: Yuki Takato, Kahoku (JP); Hirotoshi Kakuda, Kahoku (JP)

(73) Assignee: PFU LIMITED, Ishikawa (JP)

( * ) Notice: Subject to any disclaimer, the term of this patent is extended or adjusted under 35 U.S.C. 154(b) by 183 days.

(21) Appl. No.: 16/667,699

(22) Filed: Oct. 29, 2019

(65) Prior Publication Data

US 2020/0198910 A1 Jun. 25, 2020

(30) Foreign Application Priority Data

Dec. 20, 2018 (JP) .............................. JP2018-238430

(51) Int. Cl.
*B65H 5/06* (2006.01)
*B65H 5/36* (2006.01)
(Continued)

(52) U.S. Cl.
CPC ............... *B65H 5/062* (2013.01); *B65H 1/02* (2013.01); *B65H 3/06* (2013.01); *B65H 5/36* (2013.01);
(Continued)

(58) Field of Classification Search
CPC ........ B65H 2402/633; B65H 2404/144; B65H 2404/152; B65H 2404/1526;
(Continued)

(56) References Cited

U.S. PATENT DOCUMENTS

| | | | |
|---|---|---|---|
| 6,381,423 B1 * | 4/2002 | Eom | G03G 15/2064 399/45 |
| 10,604,365 B2 | 3/2020 | Hayashi | |

(Continued)

FOREIGN PATENT DOCUMENTS

| | | |
|---|---|---|
| JP | 2005-328216 A | 11/2005 |
| JP | 2013-35673 A | 2/2013 |

(Continued)

OTHER PUBLICATIONS

Office Action dated May 27, 2021 corresponding to U.S. Appl. No. 16/667,699 (8 pages).

*Primary Examiner* — Negussie Worku
(74) *Attorney, Agent, or Firm* — Lewis Roca Rothgerber Christie LLP

(57) ABSTRACT

A medium conveying apparatus includes an imaging device to image a medium and configured to move in a moving direction, a roller configured to move in the moving direction, on an upstream side of the imaging device, a conveyance guide provided with the imaging device to move the imaging device, wherein the conveyance guide includes a slope for coming into contact with the medium, an engaging member provided with the imaging device to move the imaging device, and a moving member to move the imaging device by engaging with the engaging member in conjunction with a movement of the roller. The engaging member and the moving member are configured to be separated at a distance from one another when the medium is not conveyed. The moving member moves the imaging device by engaging with the engaging member only when the medium has a thickness greater than the distance.

7 Claims, 20 Drawing Sheets

(51) Int. Cl.
  *H04N 1/00* (2006.01)
  *B65H 1/02* (2006.01)
  *B65H 3/06* (2006.01)

(52) U.S. Cl.
  CPC ... *H04N 1/00559* (2013.01); *B65H 2404/144* (2013.01); *B65H 2801/39* (2013.01)

(58) Field of Classification Search
  CPC ............ B65H 2404/16; B65H 2511/13; B65H 2801/39; B65H 5/062; B65H 1/02; B65H 20/02; B65H 3/06; B65H 5/068; B65H 5/36; H04N 1/00557; H04N 1/00559; H04N 1/0057; H04N 1/00602; H04N 1/00604; H04N 2201/0081; H04N 2201/0094
  USPC ......................................................... 358/408
  See application file for complete search history.

(56) References Cited

U.S. PATENT DOCUMENTS

| | | | |
|---|---|---|---|
| 2005/0254103 A1* | 11/2005 | Sugiyama | G03G 15/60 358/474 |
| 2009/0231643 A1* | 9/2009 | Tan | H04N 1/00533 358/498 |
| 2018/0046128 A1* | 2/2018 | Tomita | G03G 21/0011 |
| 2019/0100394 A1* | 4/2019 | Anami | H04N 1/00994 |
| 2019/0270604 A1 | 9/2019 | Morikawa | |
| 2019/0306355 A1* | 10/2019 | Matsue | H04N 1/2032 |
| 2020/0198910 A1* | 6/2020 | Takato | H04N 1/00604 |
| 2020/0198916 A1* | 6/2020 | Shiraiwa | B65H 5/062 |
| 2021/0188579 A1* | 6/2021 | Shimosaka | B65H 5/062 |

FOREIGN PATENT DOCUMENTS

| | | |
|---|---|---|
| WO | WO 2018/116365 A1 | 6/2018 |
| WO | WO 2018/167934 A1 | 9/2018 |

\* cited by examiner

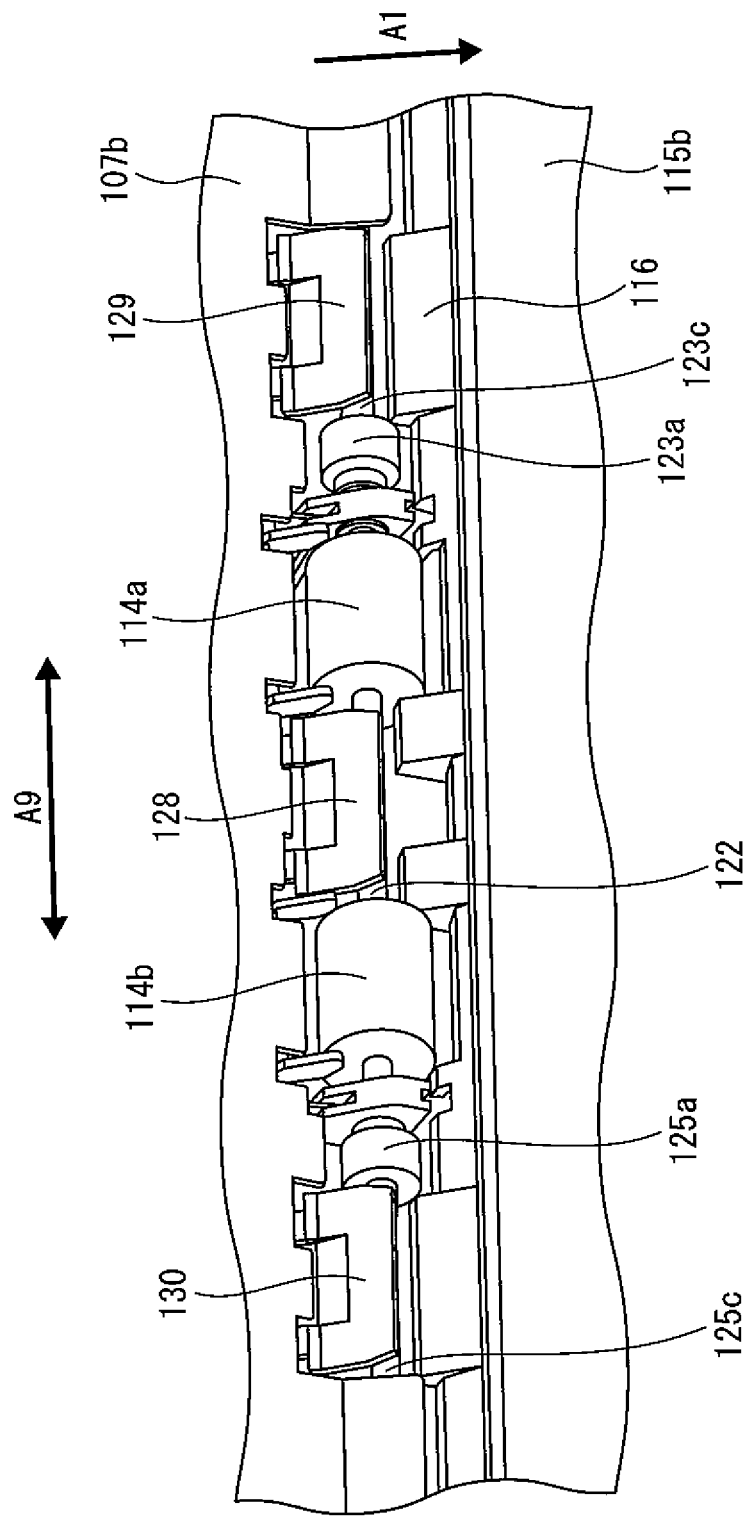

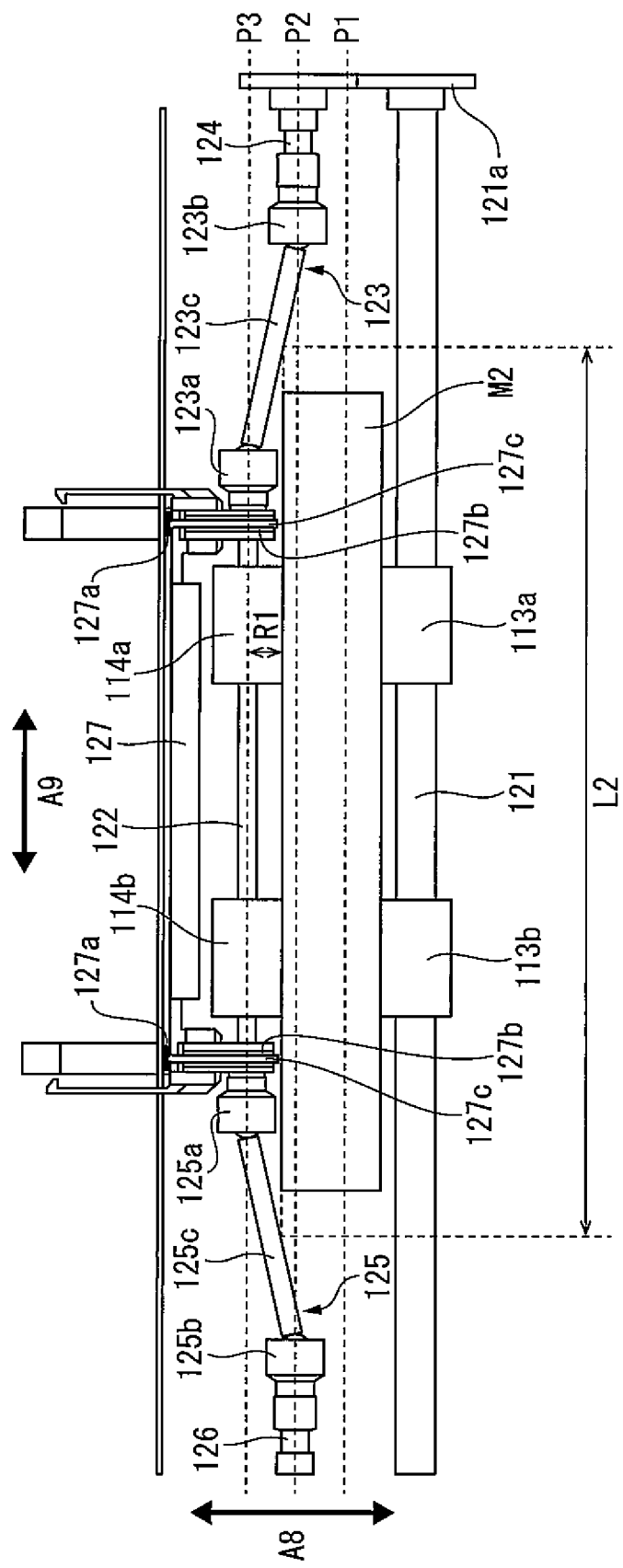

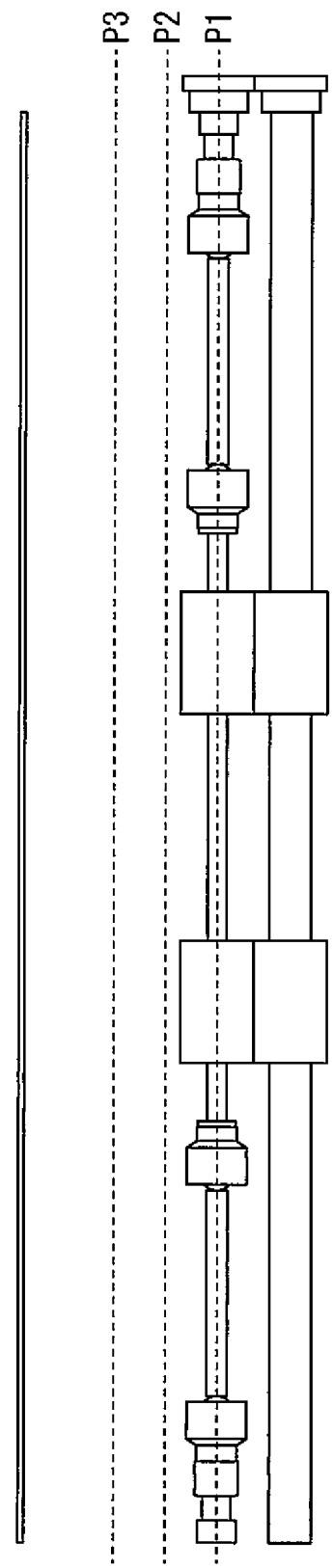

MEDIUM CONVEYING APPARATUS FOR MOVING AN IMAGING DEVICE IN CONJUNCTION WITH A THICKNESS OF A MEDIUM

CROSS-REFERENCE TO RELATED APPLICATIONS

This application is based upon and claims the benefit of priority of prior Japanese Patent Application No. 2018-238430, filed on Dec. 20, 2018, the entire contents of which are incorporated herein by reference.

TECHNICAL FIELD

Embodiments discussed in the present specification relate to medium conveyance.

BACKGROUND

It is desired that a medium conveying apparatus such as a scanner device imaging a medium while conveying the medium can satisfactorily image media with various thicknesses. Accordingly, a medium conveying apparatus in which an imaging device for imaging a medium is located to be movable according to a thickness of a conveyed medium has been developed.

A medium conveying apparatus including an upper image sensor and a conveyance guide that are provided to be movable in parallel with a vertical direction is disclosed (see International Application Publication No. WO 2018/116365). In a case that a thick document is conveyed on a conveyance path in the medium conveying apparatus, the conveyance guide is raised, and when the conveyance guide is raised to a predetermined height, an image sensor hooking part included in the conveyance guide contacts a hooked part of the upper image sensor and raises the upper image sensor.

An image reading device in which driven rollers being a pair of upstream and downstream rollers are configured to be vertically movable, and roller shafts of the rollers come into contact from below with a receiving part protruding from an image reading unit is disclosed (see Japanese Unexamined Patent Publication (Kokai) No. 2005-328216). When a sheet material is held by at least either of conveyance nips of the pair of upstream or downstream rollers in the image reading device, an image reading unit is pushed up by the roller shaft, and a width of an image reading gap is kept equivalent to the thickness of the sheet material.

A reading device in which a roller housing for supporting a roller is provided with a CIS module is disclosed (see U.S. Patent Application Publication No. 2009/0231643). When a thick document is inserted into the reading device, the document pushes up the roller and causes the roller housing to move upward with the CIS module.

SUMMARY

According to some embodiments, a medium conveying apparatus includes an imaging device to image a medium and configured to move in a moving direction perpendicular to a medium conveying direction, a roller configured to move in the moving direction, on an upstream side of the imaging device in the medium conveying direction, a conveyance guide provided with the imaging device to move the imaging device, wherein the conveyance guide includes a slope for coming into contact with the medium, an engaging member provided with the imaging device to move the imaging device, and a moving member to move the imaging device by engaging with the engaging member in conjunction with a movement of the roller. The engaging member and the moving member are configured to be separated at a distance from one another when the medium is not conveyed. The moving member moves the imaging device by engaging with the engaging member only when the medium has a thickness greater than the distance.

It is to be understood that both the foregoing general description and the following detailed description are exemplary and explanatory, and are not restrictive of the invention, as claimed.

BRIEF DESCRIPTION OF DRAWINGS

FIG. 5A is a schematic diagram for illustrating a shape of a first receiving member 123a.

FIG. 5B is a schematic diagram for illustrating the shape of the first receiving member 123a.

FIG. 5C is a schematic diagram for illustrating the shape of the first receiving member 123a.

FIG. 6 is a schematic diagram for illustrating a second conveyance guide 128, etc.

FIG. 9B is a schematic diagram for illustrating the operation of the joints.

FIG. 10A is a schematic diagram for illustrating a technical meaning.

DESCRIPTION OF EMBODIMENTS

It is to be understood that both the foregoing general description and the following detailed description are exemplary and explanatory, and are not restrictive of the invention, as claimed.

Hereinafter, a medium conveying apparatus according to an embodiment, will be described with reference to the drawings. However, it should be noted that the technical scope of the invention is not limited to these embodiments, and extends to the inventions described in the claims and their equivalents.

Figure 1:
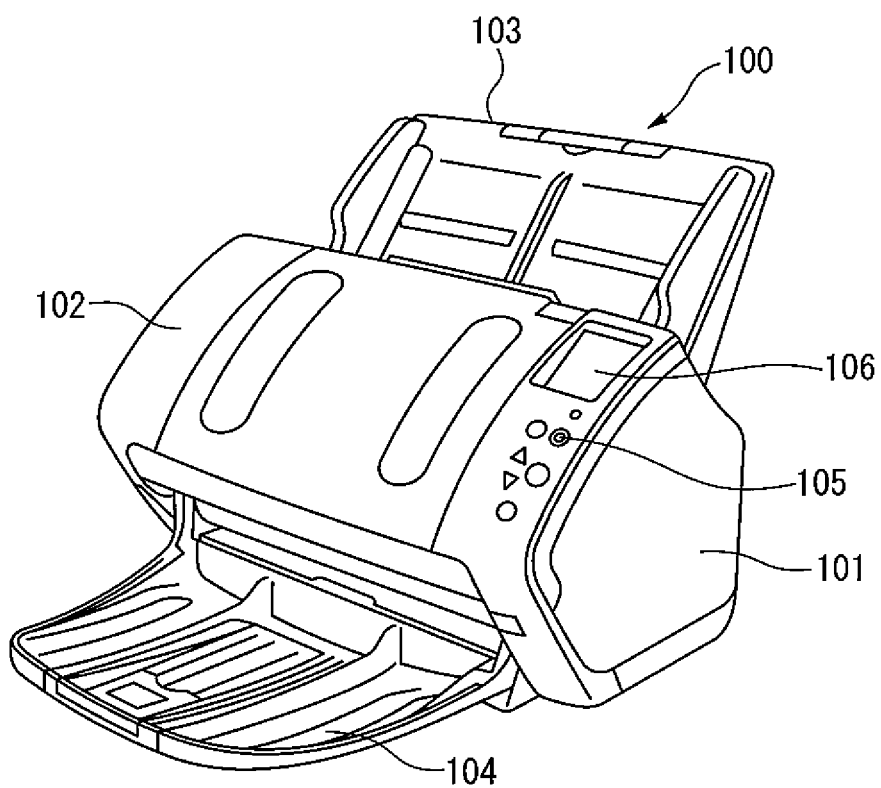
FIG. 1 is a perspective view illustrating a medium conveying apparatus 100 according to an embodiment.

FIG. 1 is a perspective view illustrating a medium conveying apparatus 100 configured as an image scanner. The medium conveying apparatus 100 conveys and images a medium being a document. A medium is paper, thick paper, a plastic card, a passport, etc. The medium conveying apparatus 100 may be a fax machine, a copying machine, a multifunctional peripheral (MFP), etc.

The medium conveying apparatus 100 includes a lower housing 101, an upper housing 102, a medium tray 103, an ejection tray 104, an operation device 105, and a display device 106.

The upper housing 102 is located in a position covering a top surface of the medium conveying apparatus 100, and is engaged with the lower housing 101. The medium tray 103 is engaged with the lower housing 101 in such a way as to be able to place a medium to be conveyed. The ejection tray 104 is engaged with the lower housing 101 in such a way as to be able to hold an ejected medium.

The operation device 105 includes an input device such as a button, and an interface circuit acquiring a signal from the input device, receives an input operation by a user, and outputs an operation signal based on the input operation by the user. The display device 106 includes a display including a liquid crystal or organic electro-luminescence (EL), and an interface circuit for outputting image data to the display, and displays the image data on the display.

Figure 2:
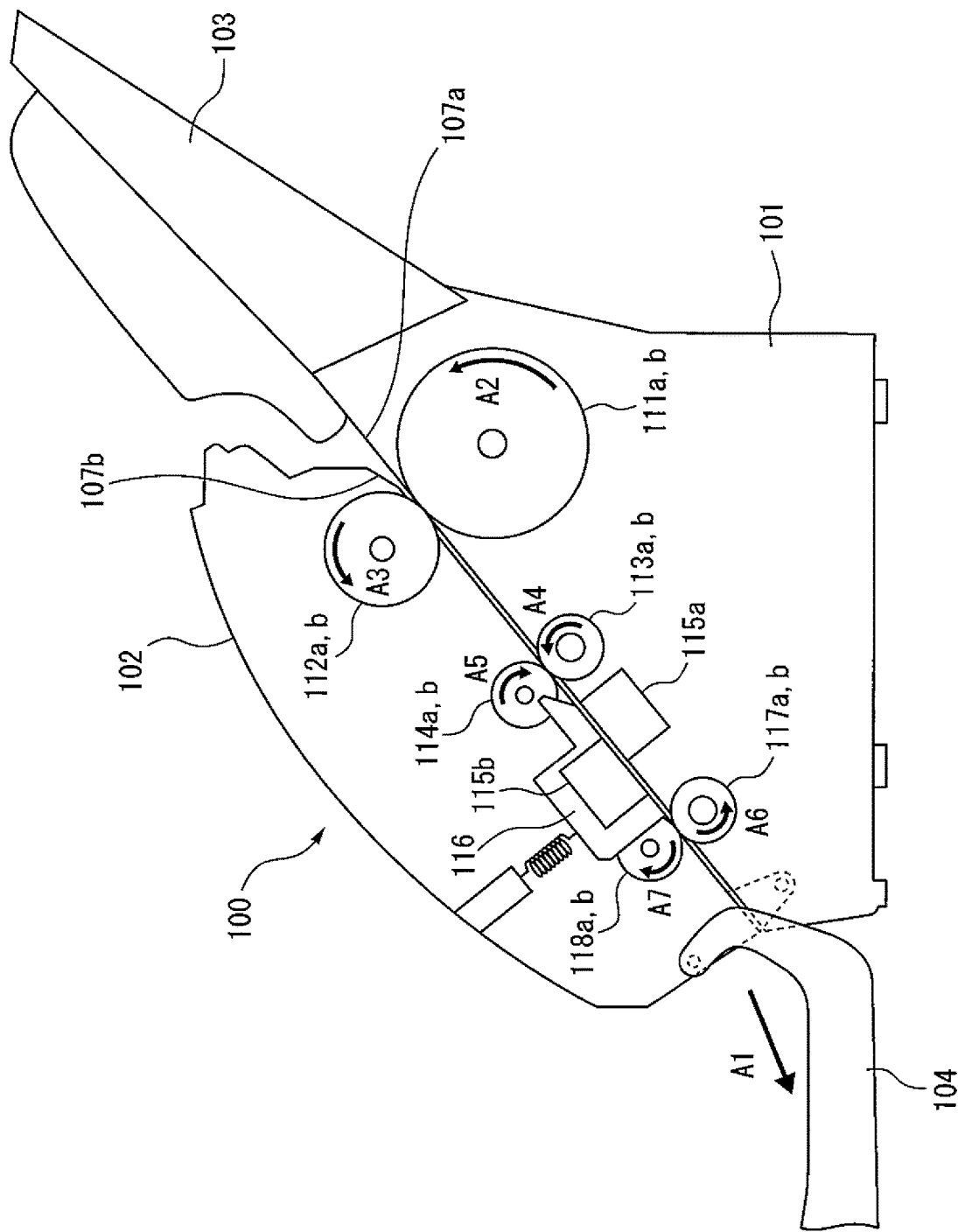
FIG. 2 is a diagram for illustrating a conveyance path inside the medium conveying apparatus 100.

FIG. 2 is a diagram for illustrating a conveyance path inside the medium conveying apparatus 100.

The conveyance path inside the medium conveying apparatus 100 includes feed rollers 111a and b, retard rollers 112a and b, first conveyance rollers 113a and b, second conveyance rollers 114a and b, a first imaging device 115a, a second imaging device 115b, a conveyance guide 116, third conveyance rollers 117a and b, and fourth conveyance rollers 118a and b, etc.

The feed rollers 111a and 112l may be hereinafter collectively referred to as feed rollers 111. Further, the retard rollers 112a and 112b may be collectively referred to as retard rollers 112. Further, the first conveyance rollers 113a and 113b may be collectively referred to as first conveyance rollers 113. Further, the second conveyance rollers 114a and 114b may be collectively referred to as second conveyance rollers 114. Further, the third conveyance rollers 117a and 117b may be collectively referred to as third conveyance rollers 117. Further, the fourth conveyance rollers 118a and 118b may be collectively referred to as fourth conveyance rollers 118. Further, the first imaging device 115a and the second imaging device 115b may be collectively referred to as imaging devices 115.

A top surface of the lower housing 101 forms a lower guide 107a of a conveyance path of a medium, and a bottom surface of the upper housing 102 forms an upper guide 107b of the conveyance path of a medium. An arrow A1 in FIG. 2 indicates a medium conveying direction. An upstream hereinafter refers to an upstream in the medium conveying direction A1, and a downstream refers to a downstream in the medium conveying direction A1.

The first conveyance rollers 113 and the second conveyance rollers 114 are located on the downstream side of the feed rollers 111 and the retard rollers 112, and also on the upstream side of the imaging devices 115, and convey a medium to the imaging devices 115. The second conveyance rollers 114 are located to face the first conveyance rollers 113 above the first conveyance rollers 113, and hold and convey a medium with the first conveyance rollers 113. The second conveyance roller 114 is an example of a roller located to be movable in a direction perpendicular to the conveying direction of a medium, on the upstream side of an imaging device in the conveying direction of a medium. Further, the first conveyance roller 113 is an example of a first roller, and the second conveyance roller 114 is an example of a second roller.

The first imaging device 115a includes a reduction optical system type line sensor including an imaging element based on charge coupled devices (CCDs) linearly located in a main scanning direction. The image sensor images a back side of a conveyed medium, and generates and outputs an analog image signal. The second imaging device 115b is located to face the first imaging device 115a above the first imaging device 115a. The second imaging device 115b includes a reduction optical system type line sensor including an imaging element based on CCDs linearly located in the main scanning direction. The image sensor images a front side of a conveyed medium, and generates and outputs an analog image signal. The second imaging device 115b is an example of an imaging device. The first imaging device 115a may not be located, and only the second imaging device 115b may be located in the medium conveying apparatus 100; and only one side of a medium may be read. Further, a unity-magnification optical system type contact image sensor (CIS) including an imaging element based on a complementary metal oxide semiconductor (CMOS) may be used in place of the imaging element based on CCDs.

The conveyance guide 116 is provided with the second imaging device 115b to move the second imaging device 115b. The conveyance guide 116 is formed by a member separate from the second imaging device 115b. The conveyance guide 116 may be formed by a member integrated with the second imaging device 115b. The conveyance guide 116 has an eaves-like shape and guides a medium conveyed by the first conveyance rollers 113 and the second conveyance rollers 114 between the first imaging device 115a and the second imaging device 115b.

The third conveyance rollers 117 and the fourth conveyance rollers 118 are located on the downstream side of the imaging devices 115 and eject a medium to the ejection tray 104. The fourth conveyance rollers 118 are located to face the third conveyance rollers 117 above the third conveyance rollers 117.

A medium placed on the medium tray 103 is conveyed between the lower guide 107a and the upper guide 107b in the medium conveying direction A1 by the feed rollers 111 rotating in a direction of an arrow A2 in FIG. 2. When a medium is conveyed, the retard rollers 112 rotate in a direction of an arrow A3. By the workings of the feed rollers 111 and the retard rollers 112, when a plurality of media are placed on the medium tray 103, only a medium in contact with the feed rollers 111, out of the media placed on the medium tray 103, is separated. Consequently, the medium conveying apparatus 100 operates in such a way that conveyance of a medium other than the separated medium is restricted (prevention of multi-feed).

A medium is fed between the first conveyance rollers 113 and the second conveyance rollers 114 while being guided by the lower guide 107a and the upper guide 107b. The medium is fed between the first imaging device 115a and the second imaging device 115b along the conveyance guide 116 by the first conveyance rollers 113 and the second conveyance rollers 114 rotating in directions of an arrow A4 and an arrow A5, respectively. The medium read by the imaging devices 121 is ejected on the ejection tray 104 by the third conveyance rollers 122 and the fourth conveyance rollers 123 rotating in directions of an arrow A6 and an arrow A7, respectively.

Figure 3:
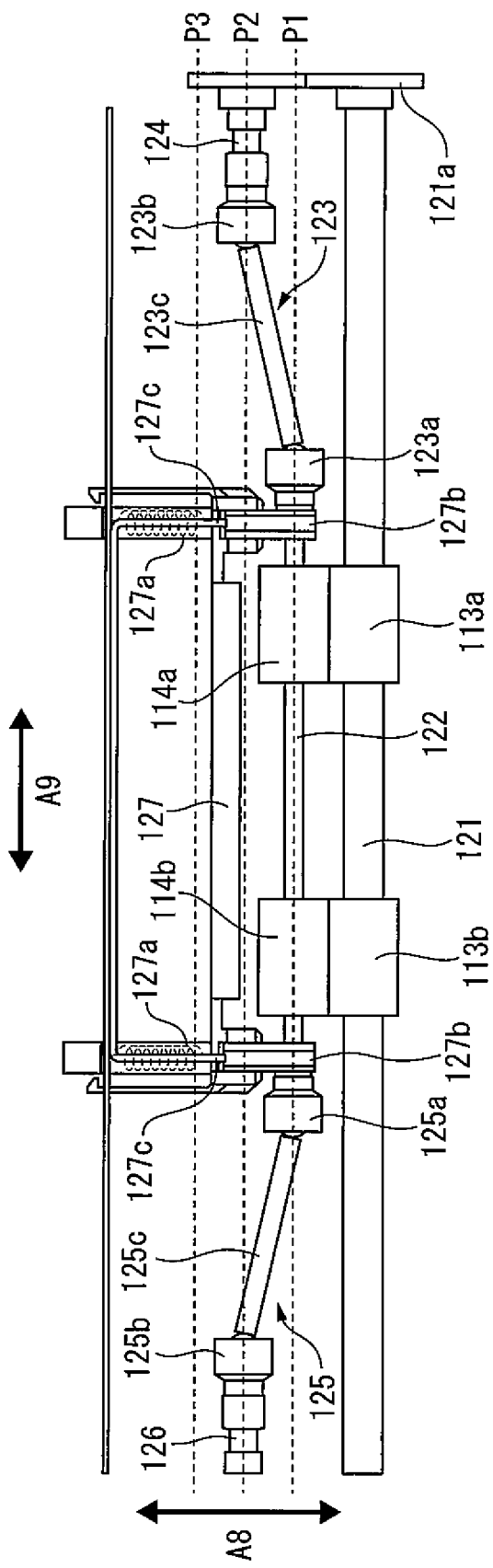
FIG. 3 is a schematic diagram for illustrating a location of second conveyance rollers 114, etc.

FIG. 3 is a schematic diagram for illustrating a location of the first conveyance rollers 113 and the second conveyance rollers 114.

FIG. 3 is a schematic diagram of the first conveyance rollers 113, the second conveyance rollers 114, etc., viewed from the upstream side in the medium conveying direction A1. As illustrated in FIG. 3, the medium conveying apparatus 100 further includes a first shaft 121, a second shaft 122, a first joint 123, a third shaft 124, a second joint 125, a fourth shaft 126, and a moving member 127.

The first shaft 121 is the rotation axis of the first conveyance rollers 113. The first shaft 121 is connected to a driving device, to be described later, through a gear group 121a. The first conveyance rollers 113 are provided on the first shaft 121 and are rotated around the first shaft 121 by the driving device. The first shaft 121 and the first conveyance rollers 113 are fixed to the lower housing 101.

The second shaft 122 is the rotation axis of the second conveyance rollers 114. The second conveyance rollers 114 are provided on the second shaft 122 and rotate around the second shaft 122.

The first joint 123 is a universal joint and includes a first receiving member 123a, a second receiving member 123b, and a joint shaft 123c. The first receiving member 123a is provided to be fixed to one end of the second shaft 122 and is connected to the second shaft 122. The second receiving member 123b is provided to be fixed to one end of the third shaft 124 and is connected to the third shaft 124. The joint shaft 123c connects the first receiving member 123a and the second receiving member 123b. Consequently, the first joint 123 connects the second shaft 122 and the third shaft 124 in a freely tiltable manner and also transmits a rotation driving force from the third shaft 124 to the second shaft 122. In other words, the first joint 123 connects the second conveyance roller 114 and the third shaft 124. The first joint 123 is configured to keep connecting the second conveyance roller 114 and the fourth shaft 126 when the second conveyance roller 114 moves in a vertical direction.

The third shaft 124 is a drive shaft rotated by the driving device, and rotates the second conveyance roller 114. One end of the third shaft 124 is connected to the second receiving member 123b, and the other end of the third shaft 124 is connected to the driving device through the gear group 121a. Consequently, the third shaft 124 transmits a rotation driving force from the driving device to the first joint 123, and the second conveyance rollers 114 are rotated by the driving device.

The second joint 125 is a universal joint and includes a first receiving member 125a, a second receiving member 125b, and a joint shaft 125c. The first receiving member 125a is provided to be fixed to the other end (the end not connected to the first receiving member 123a of the first joint 123) of the second shaft 122 and is connected to the second shaft 122. The second receiving member 125b is provided to be fixed to one end of the fourth shaft 126 and is connected to the fourth shaft 126. The joint shaft 125c connects the first receiving member 125a and the second receiving member 125b. Consequently, the second joint 125 connects the second shaft 122 and the fourth shaft 126 in a freely tiltable manner and also transmits a rotation driving force from the second shaft 122 to the fourth shaft 126. The first joint 123 and the second joint 125 may be hereinafter collectively referred to as joints. In other words, the second joint 125 connects the second conveyance roller 114 and the fourth shaft 126. The second joint 125 is configured to keep connecting the second conveyance roller 114 and the third shaft 124 when the second conveyance roller 114 moves in a vertical direction.

The fourth shaft 126 is a drive shaft rotated by the driving device, and rotates the second conveyance roller 114. One end of the fourth shaft 126 is connected to the second receiving member 125b, and the other end of the fourth shaft 126 is fixed to the upper housing 102. Consequently, the fourth shaft 126 is rotated by a rotation driving force from the driving device.

The third shaft 124 and the fourth shaft 126 are located at an intermediate position P2 on the upper side of a first position P1 where the second conveyance rollers 114 are in contact with the first conveyance rollers 113 in a direction A8 perpendicular to the medium conveying direction. The direction A8 perpendicular to the medium conveying direction is a direction perpendicular to an imaging surface of the first imaging device 115a, an imaging surface of the second imaging device 115b, or a medium conveyance surface. Further, the first position P1 is the center position of the second conveyance rollers 114 when the second conveyance rollers 114 are in contact with the first conveyance rollers 113, and the intermediate position P2 is the center position of the third shaft 124 and the fourth shaft 126. In a state in which a medium is not conveyed, the first receiving members 123a and 125a are located at the first position P1 in the direction A8 perpendicular to the medium conveying direction, and the second receiving members 123b and 125b are located at the position intermediate P2. Consequently, the joint shafts 123c and 125c are located in a tilted manner in such a way as to rise from the central side to the outside in a main scanning direction A9 of the imaging device 115.

The moving member 127 is provided on the second shaft 122. One end of a spring 127a the other end of which is supported by the upper housing 102 is mounted on a top surface of the moving member 127, and the moving member 127, the second shaft 122, and the second conveyance rollers 114 are urged by the springs 127a in a direction toward the first conveyance rollers 113 side. The spring 127a is an example of a pressing member and presses the second conveyance rollers 114 toward the first conveyance rollers 113 side.

Further, two groove parts 127b extending in the direction A8 perpendicular to the medium conveying direction are formed on the moving member 127. Each groove part 127b is fixed to the upper housing 102 and also is engaged with a plate member 127c extending in the direction A8 perpendicular to the medium conveying direction. By each of the two groove parts 127b moving along the plate member 127c, the moving member 127 moves in the direction A8 perpendicular to the medium conveying direction without tilting against the medium conveyance surface. The second shaft 122 and the second conveyance rollers 114 are located to be movable in the direction A8 perpendicular to the medium conveying direction in conjunction with a movement of the moving member 127. In other words, the second shaft 122 and the second conveyance rollers 114 are configured to move in the direction A8 perpendicular to the medium conveying direction. The direction A8 perpendicular to the medium conveying direction is an example of a moving direction.

Figure 4A:
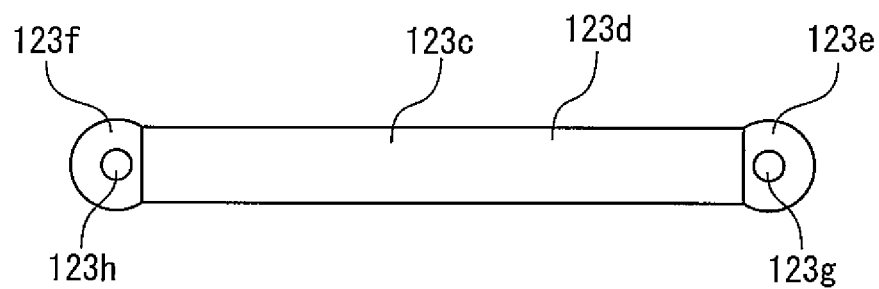
FIG. 4A is a schematic diagram for illustrating a shape of a joint shaft 123c.
Figure 4B:
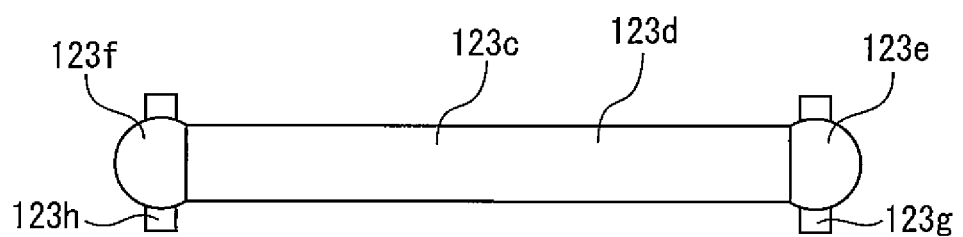
FIG. 4B is a schematic diagram for illustrating the shape of the joint shaft 123c.

FIG. 4A and FIG. 4B are schematic diagrams for illustrating a shape of the joint shaft 123c of the first joint 123.

FIG. 4A is a side view of the joint shaft 123c, and FIG. 4B is a plan view of the joint shaft 123c. As illustrated in FIG. 4A and FIG. 4B, a rod-shaped shaft part 123d is formed in the joint shaft 123c, and spherical joint parts 123e and 123f are formed at both ends of the shaft part 123d, respectively. Columnar protruding parts 123g and 123h are formed on the joint parts 123e and 123f, respectively, in such a way as to protrude in a direction perpendicular to a shaft direction of the shaft part 123d.

Figure 5A:
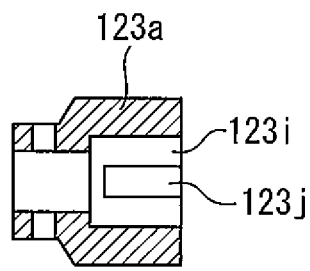
Figure 5B:
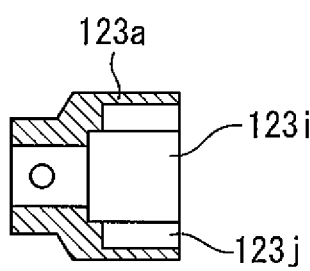
Figure 5C:
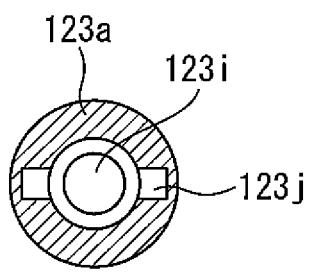

FIG. 5A, FIG. 5B, and FIG. 5C are schematic diagrams for illustrating a shape of the first receiving member 123a of the first joint 123.

FIG. 5A is a cross-sectional view of the first receiving member 123a viewed from side, FIG. 5B is a cross-sectional view of the first receiving member 123a viewed from above, and FIG. 5C is a cross-sectional view of the first receiving member 123a viewed from front. As illustrated in FIG. 5A, FIG. 5B, and FIG. 5C, the first receiving member 123a is cylindrically formed, and a recessed part 123i is formed on the first receiving member 123a. A slit 123j is formed on the recessed part 123i. By the joint part 123e being inserted into the recessed part 123i and the protruding part 123g being fitted into the slit 123j, the joint shaft 123c is engaged with the first receiving member 123a in a freely tiltable and rotatable manner.

The joint shaft 125c of the second joint 125 has a shape similar to the joint shaft 123c of the first joint 123. Further, each of the second receiving member 123b of the first joint 123, and the first receiving member 125a and the second receiving member 125b of the second joint 125 has a shape similar to the first receiving member 123a of the first joint 123. Consequently, the joint shaft 123c of the first joint 123 is engaged with the second receiving member 123b in a freely tiltable and rotatable manner, and the joint shaft 125c of the second joint 125 is engaged with the first receiving member 125a and the second receiving member 125b in a freely tiltable and rotatable manner.

FIG. 6 is a schematic diagram for illustrating second conveyance guides 128, 129, and 130.

As illustrated in FIG. 6, the medium conveying apparatus 100 further includes the second conveyance guides 128, 129, and 130. The second conveyance guides 128, 129, and 130 are swingably provided on the upper guide 107b by hinges. The second conveyance guide 128 is located between the second shaft 122 and the medium conveyance path in such a way as to face the second shaft 122 and cover the second shaft 122. The second conveyance guide 129 is located between the first joint 123 and the medium conveyance path in such a way as to face the first joint 123 and cover the first joint 123. The second conveyance guide 130 is located between the second joint 125 and the medium conveyance path in such a way as to face the second joint 125 and cover the second joint 125. Each of the second conveyance guides 129 and 130 is an example of a conveyance guide located between a joint and a medium conveyance path.

Figure 7:
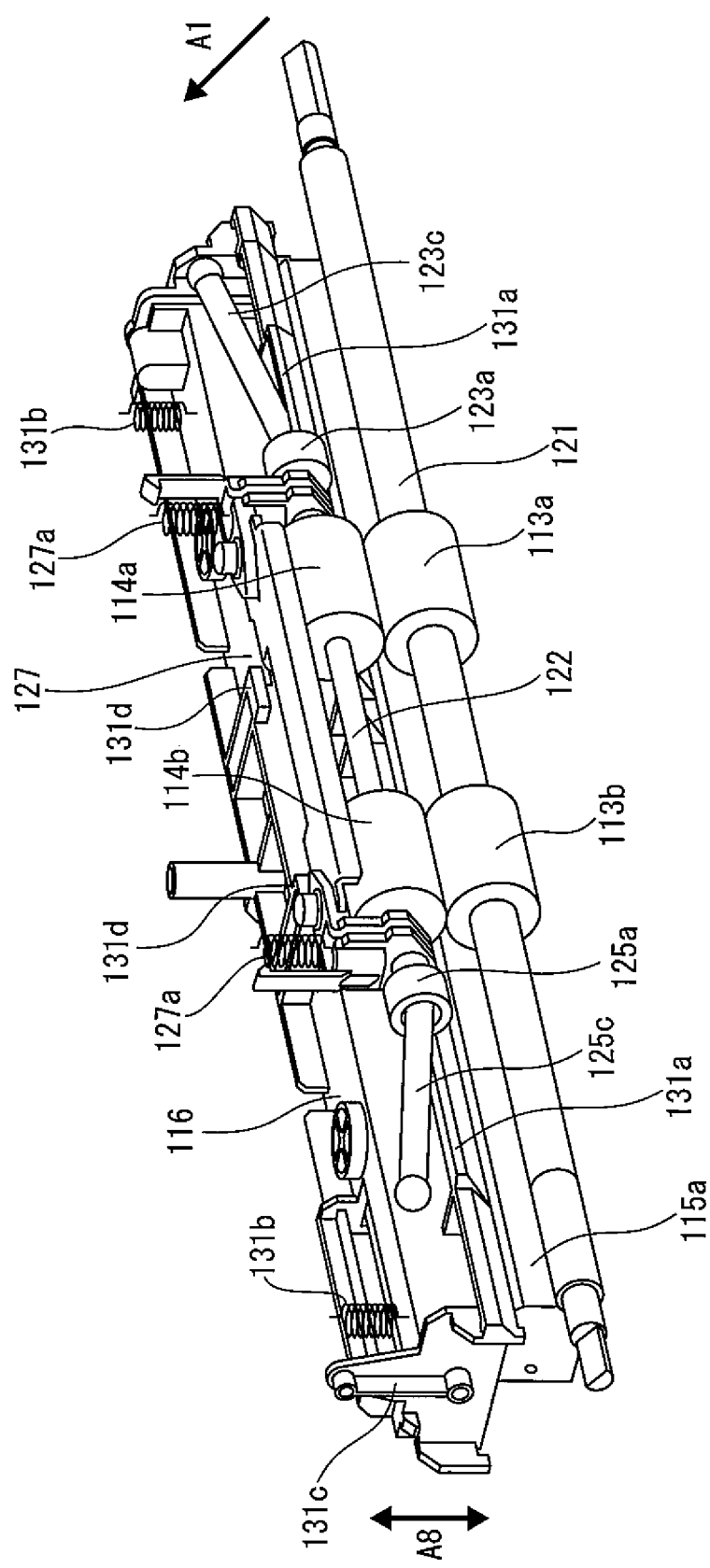
FIG. 7 is a schematic diagram for illustrating a positional relation of the second conveyance rollers 114, etc.

FIG. 7 is a schematic diagram for illustrating a positional relation of the second conveyance rollers 114 and the conveyance guide 116.

As illustrated in FIG. 7, a guide part 131a protruding toward the second conveyance rollers 114 side (the upstream side in the medium conveying direction A1) and also guiding a conveyed medium between the first imaging device 115a and the second imaging device 115b is formed on the conveyance guide 116. In other words, the conveyance guide 116 is provided to protrude to the second conveyance rollers 114 side.

One end of a spring 131b the other end of which is supported by the upper housing 102 is mounted on the top surface of the conveyance guide 116, and the conveyance guide 116 is urged by the spring 131b in a direction toward the first imaging device 115a side. Further, projecting parts 131c extending in the direction A8 perpendicular to the medium conveying direction are formed at both ends of the conveyance guide 116, respectively. Each projecting part 131c is engaged with an unillustrated groove part being formed on the upper housing 102 and extending in the direction A8 perpendicular to the medium conveying direction.

By each of the projecting parts 131c provided at both ends of the conveyance guide 116 moving along the groove parts formed on the upper housing 102, the conveyance guide 116 moves in the direction A8 perpendicular to the medium conveying direction without tilting against the medium conveyance surface. The second imaging device 115b is located to be movable in the direction A8 perpendicular to the medium conveying direction in conjunction with a movement of the conveyance guide 116. In other words, the second imaging device 115b is configured to move in the direction A8 perpendicular to the medium conveying direction. On the other hand, the first imaging device 115a is fixed to the lower housing 101.

Further, the conveyance guide 116 is provided with an engaging member 131d capable of engaging with the moving member 127, on the upstream side in the medium conveying direction A1 and above the guide part 131a. The engaging member 131d is provided with the second imaging device 115b to move the second imaging device 115b. The engaging member 131d is an arm and is formed by a member integrated with the conveyance guide 116. The engaging member 131d may be formed by a member separate from the conveyance guide 116.

A location relation of the third conveyance rollers 117 and the fourth conveyance rollers 118 is almost similar to the location relation of the first conveyance rollers 113 and the second conveyance rollers 114 illustrated in FIG. 3. The third conveyance rollers 117 is fixed to the lower housing 101. On the other hand, a shaft of the fourth conveyance rollers 118 is connected to a joint connecting the shaft of the fourth conveyance rollers 118 and a drive shaft rotated by a driving device in a freely tiltable manner. The joint includes a first receiving member connected to the shaft of the fourth conveyance rollers 118, a second receiving member connected to the drive shaft, and a joint shaft connecting the first receiving member and the second receiving member, similarly to the first joint 123 and the second joint 125. Further, the joint is located in a location relation similar to those of the first joint 123 and the second joint 125.

Further, the shaft of the fourth conveyance rollers 118 is provided with a moving member moving in conjunction with a movement of the fourth conveyance rollers 118, and the moving member and the fourth conveyance rollers 118 are located to be movable in the direction A8 perpendicular to the medium conveying direction by a spring.

Figure 8:
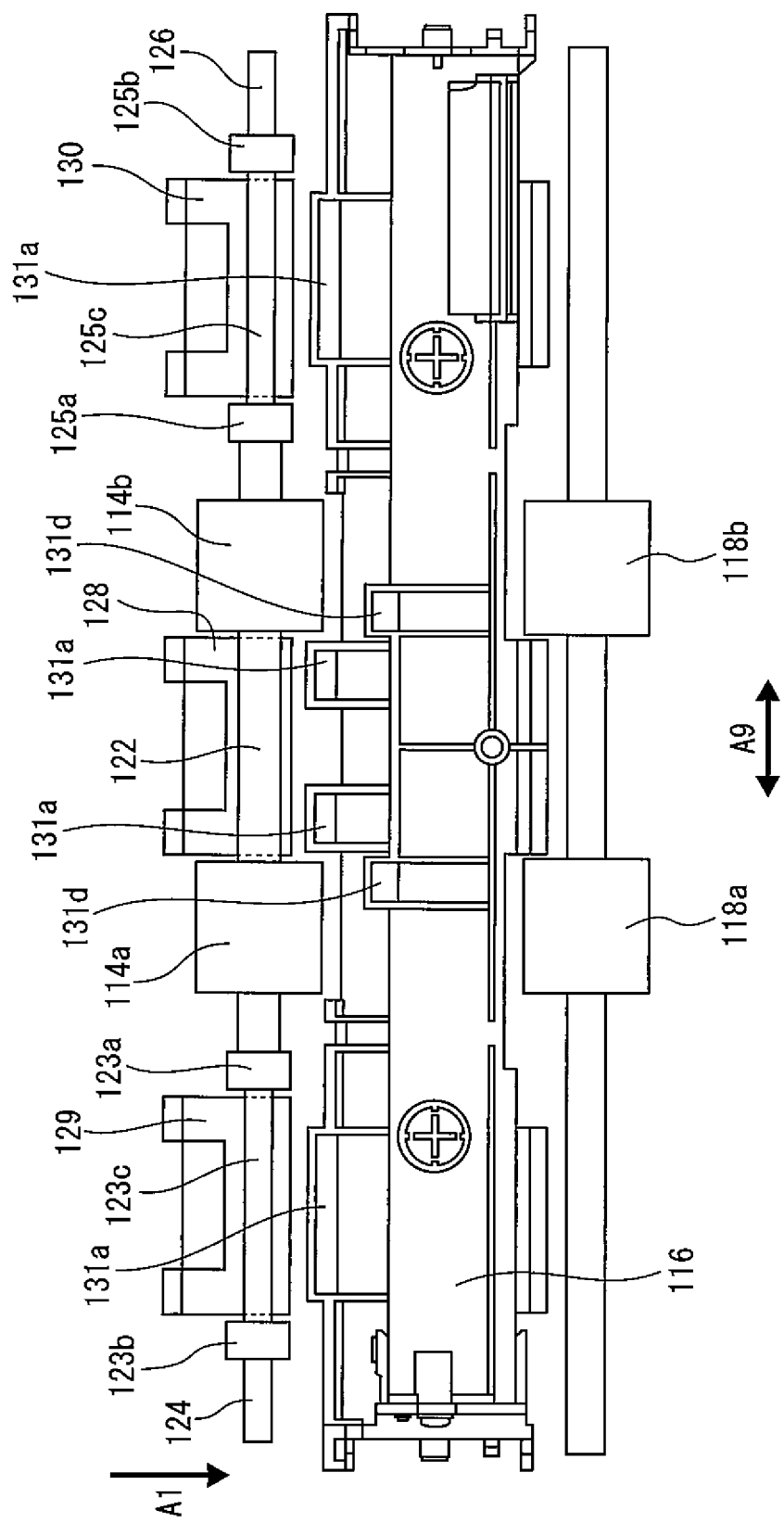
FIG. 8 is a schematic diagram for illustrating a positional relation of the second conveyance rollers 114, etc.

FIG. 8 is a schematic diagram for illustrating a positional relation of the second conveyance rollers 114 and the conveyance guide 116.

FIG. 8 is a diagram of the second conveyance rollers 114, the conveyance guide 116, etc., viewed from above. As illustrated in FIG. 8, the guide part 131a of the conveyance guide 116 is located at a position not facing the second conveyance rollers 114. Particularly, the guide part 131a is located at a position not overlapping the second conveyance rollers 114 in the main scanning direction A9 of the imaging device 115. On the other hand, an end of the guide part 131a on the second conveyance rollers 114 side is located more toward the second conveyance rollers 114 side (upstream side) than ends of the second conveyance rollers 114 on the second imaging device 115b side in the medium conveying direction A1 (a subscanning direction of the imaging device 115). Consequently, the guide part 131a can start guiding a medium immediately after the medium is conveyed by the first conveyance rollers 113 and the second conveyance rollers 114, and can more reliably guide the conveyed medium between the first imaging device 115a and the second imaging device 115b.

On the other hand, an end of the guide part 131a on the second conveyance rollers 114 side is located more toward the second imaging device 115b side (downstream side) than the second shaft 122 being the rotation axis of the second conveyance rollers 114 and an end of the joint on the second imaging device 115b side, in the medium conveying direction A1. Consequently, the guide part 131a can satisfactorily move in the direction A8 perpendicular to the medium conveying direction without contacting the second shaft 122 or the joint.

Figure 9A:
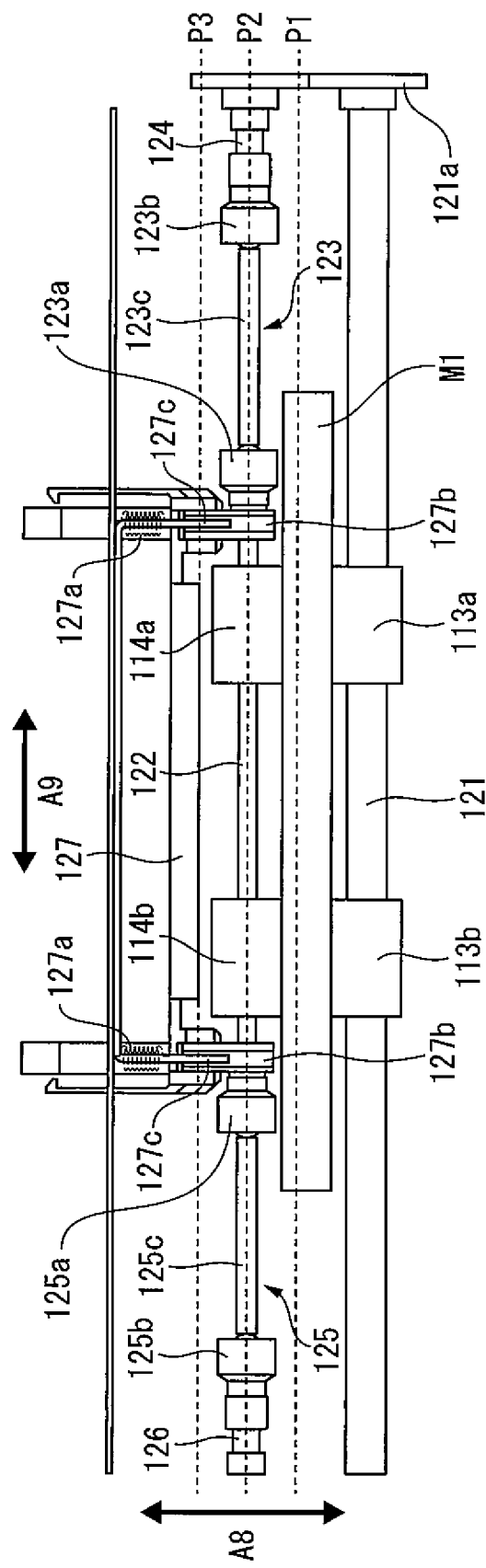
FIG. 9A is a schematic diagram for illustrating an operation of joints.

FIG. 9A and FIG. 9B are schematic diagrams for illustrating operations of the second conveyance rollers 114 and the joints when a medium is conveyed.

FIG. 9A and FIG. 9B are schematic diagrams of the first conveyance rollers 113, the second conveyance rollers 114, etc., viewed from the upstream side in the medium conveying direction A1.

FIG. 9A illustrates a state in which a medium M1 having a thickness of half a maximum thickness supported by the medium conveying apparatus 100 is conveyed between the first conveyance rollers 113 and the second conveyance rollers 114. As illustrated in FIG. 9A, the second conveyance rollers 114 are pushed upward in the direction A8 perpendicular to the medium conveying direction, that is, in a direction moving away from the medium conveyance surface by the medium M1 and move from the first position P1 to the intermediate position P2 above the first position P1. While the second receiving members 123b and 125b of the respective joints are fixed at the intermediate position P2, the first receiving members 123a and 125a are pushed upward according to the movement of the second conveyance rollers 114 and move from the first position P1 to the intermediate position P2. Consequently, the joint shafts 123c and 125c are located almost horizontal to the medium conveyance surface.

FIG. 9B illustrates a state in which a medium M2 having the maximum thickness supported by the medium conveying apparatus 100 is conveyed between the first conveyance rollers 113 and the second conveyance rollers 114. As illustrated in FIG. 9B, the second conveyance rollers 114 are pushed upward in the direction A8 perpendicular to the medium conveying direction by the medium M2 and move from the first position P1 to a second position P3 above the intermediate position P2. While the second receiving members 123b and 125b of the respective joints are fixed at the intermediate position P2, the first receiving members 123a and 125a are pushed upward according to the movement of the second conveyance rollers 114 and move from the first position P1 to the second position P3. Consequently, the joint shafts 123c and 125c are located in a tilted manner in such a way as to descend from the central side toward the outside in the main scanning direction A9 of the imaging devices 115.

As illustrated in FIG. 3, when a medium is not conveyed between the first conveyance rollers 113 and the second conveyance rollers 114, the second conveyance rollers 114 are in contact with the first conveyance rollers 113. On the other hand, as illustrated in FIG. 9A and FIG. 9B, when a medium is conveyed between the first conveyance rollers 113 and the second conveyance rollers 114, the second conveyance rollers 114 move in a direction away from the first conveyance rollers 113 according to the thickness of the conveyed medium.

The third shaft 124 and the fourth shaft 126 are located at an intermediate position P2 between the first position P1 where the second conveyance rollers 114 are in contact with the first conveyance rollers 113 and the second position P3 where the second rollers 114 separates most from the first rollers 113 in a vertical direction, that is the second conveyance rollers 114 are most separate from the first conveyance rollers 113 in a vertical direction. The second position P3 is the center position of the second conveyance rollers 114 when separating most from the first conveyance rollers 113 in the vertical direction.

As the intermediate position P2 gets closer to a central position at an equal distance from the first position P1 and the second position P3, the joint shafts 123c and 125c are less likely to separate from the first receiving members 123a and 125a and the second receiving members 123b and 125b when the second conveyance rollers 114 are located at the first position P1 or the second position P3. Accordingly, it is preferable that the intermediate position P2 be close to the central position between the first position P1 and the second position P3, and it is particularly preferable that the intermediate position P2 be the central position between the first position P1 and the second position P3. However, the intermediate position P2 has only to be set in a range in which the joint shafts 123c and 125c do not separate from the first receiving members 123a and 125a, and the second receiving members 123b and 125b when the second conveyance rollers 114 are located at the first position P1 or the second position P3. For example, the intermediate position P2 may be set in a range within a predetermined distance (for example, ¼ of the distance between the first position P1 and the second position P3) from the central position between the first position P1 and the second position P3.

Further, when a thick medium is conveyed, as the intermediate position P2 becomes more distant from the second position P3, a possibility of the medium contacting the joint shaft 123c or 125c and not being conveyed increases. Accordingly, it is preferable that, for example, when a passport is conveyed, the intermediate position P2 be set in a range in which the conveyed passport does not contact the joint shaft 123c or 125c. A length of a passport in the main scanning direction A9 is 128 mm, and a length in the direction A8 perpendicular to the medium conveying direction is 7 mm. However, since the medium may not be placed at the center of the medium tray 103 by a user, a margin for a medium placement position needs to be considered. For example, it is preferable that the intermediate position P2 be set in a range in which, when a medium with a length of 150 mm in the main scanning direction A9 and a length of 7 mm in the direction A8 perpendicular to the medium conveying direction is conveyed at the center, the medium does not contact the joint shaft 123c or 125c.

Further, as illustrated in FIG. 9B, a distance between the second position P3 where the second rollers 114 separates most from the first rollers 113 in a vertical direction and the intermediate position P2 of the third shaft 124 and the fourth shaft 126 is greater than a radius R on cross section of the second conveyance roller 114 in the vertical direction. Consequently, the medium conveying apparatus 100 can convey a medium having a thickness sufficiently greater than the radius of the second conveyance roller 114 while performing downsizing and weight reduction of the device by sufficiently reducing a size of the second conveyance roller 114.

Figure 10B:
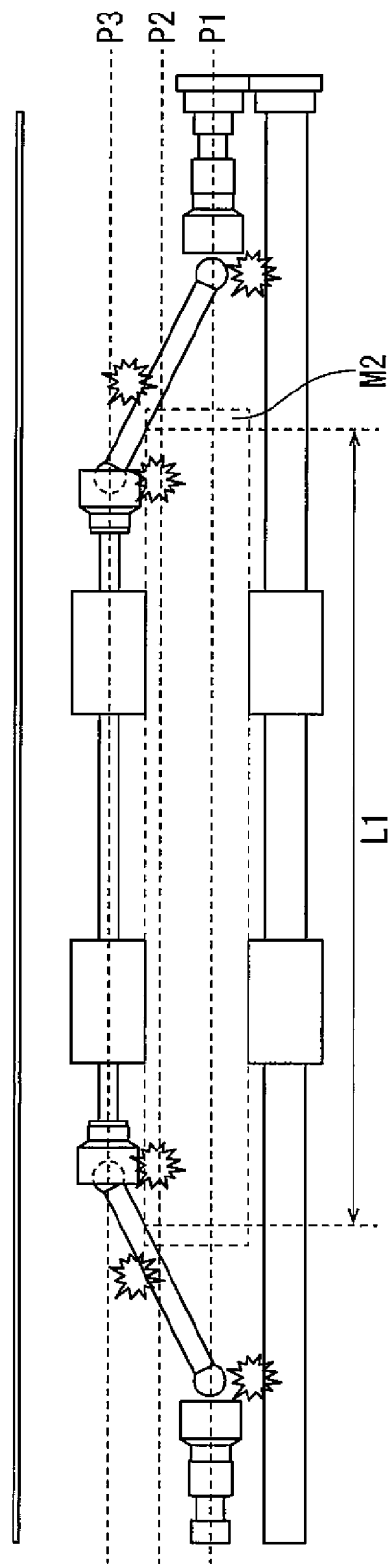
FIG. 10B is a schematic diagram for illustrating the technical meaning.

FIG. 10A and FIG. 10B are schematic diagram for illustrating a technical meaning of locating the third shaft 124 and the fourth shaft 126 at the intermediate position P2.

In an example illustrated in FIG. 10A and FIG. 10B, a third shaft and a fourth shaft are located at a first position P1 where second conveyance rollers are in contact with first conveyance rollers. In this case, as illustrated in FIG. 10B, when a medium M2 having a maximum thickness supported by a medium conveying apparatus is conveyed between the first conveyance rollers and the second conveyance rollers, a tilt of a joint shaft against a medium conveyance surface increases. Accordingly, the joint shaft may separate from a first receiving member or a second receiving member. Further, a columnar part of the joint shaft may contact the first receiving member or the second receiving member, and the joint shaft may not be able to tilt by a required angle. Furthermore, a distance L1 between the two joint shafts may decrease at a height above the medium M2, and the medium M2 may not be conveyed due to a contact with the joint shaft.

On the other hand, as illustrated in FIG. 3, FIG. 9A, and FIG. 9B, the third shaft 124 and the fourth shaft 126 are located at the intermediate position P2 in the medium conveying apparatus 100. Consequently, even when a medium M2 having a maximum thickness supported by the medium conveying apparatus 100 is conveyed between the first conveyance rollers 113 and the second conveyance rollers 114, a tilt of the joint shafts 123c and 125c against the medium conveyance surface is sufficiently small. Accordingly, the joint shafts 123c and 125c do not separate from the first receiving members 123a and 125a, or the second receiving members 123b and 125b. Further, the columnar parts of the joint shafts 123c and 125c do not contact the first receiving members 123a and 125a, or the second receiving members 123b and 125b. Furthermore, a distance L2 between the two joint shafts at a height above the medium M2 is sufficiently long, and the medium M2 does not contact the joint shafts 123c and 125c.

Figure 11A:
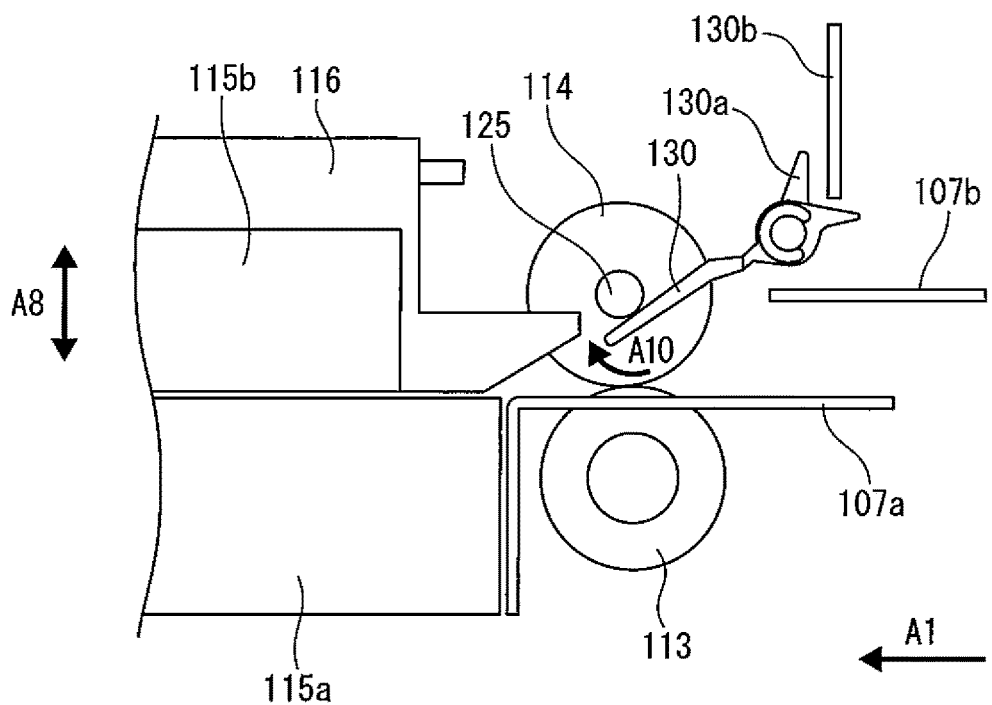
FIG. 11A is a schematic diagram for illustrating operations of a second conveyance guide 130, etc.
Figure 11B:
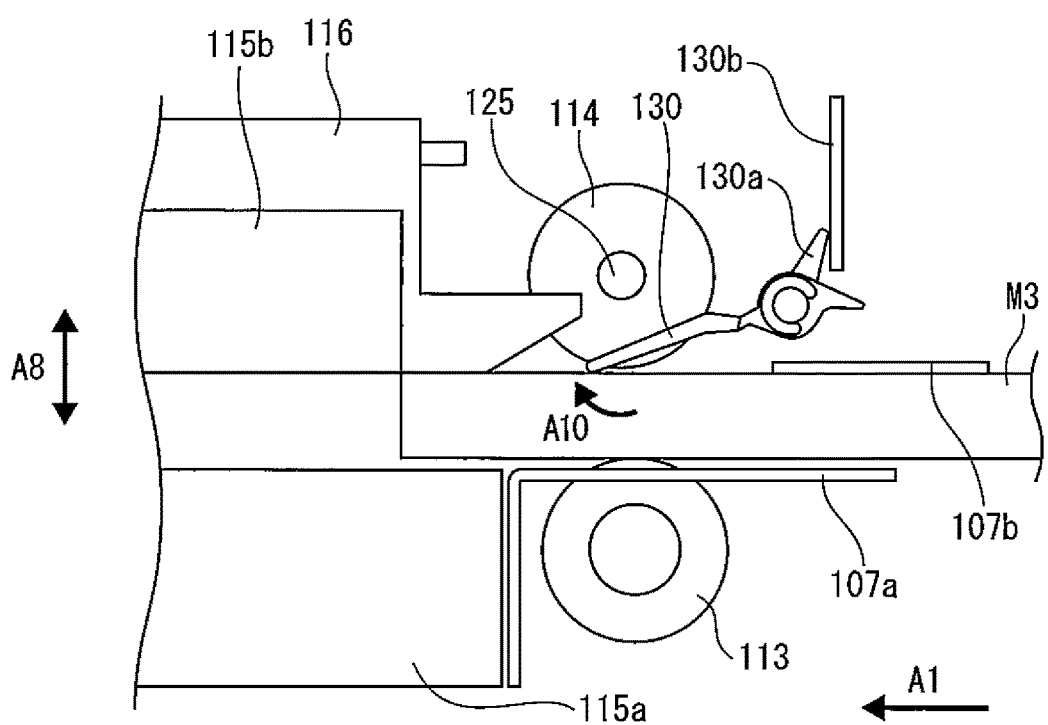
FIG. 11B is a schematic diagram for illustrating operations of the second conveyance guide 130, etc.

FIG. 11A and FIG. 11B are schematic diagrams for illustrating operations of the second conveyance rollers 114 and the second conveyance guide 130 when a medium is conveyed.

FIG. 11A and FIG. 11B are diagrams of the second conveyance rollers 114, the second conveyance guide 130, etc., viewed from side.

FIG. 11A illustrates a state in which a medium is not conveyed between the first conveyance rollers 113 and the second conveyance rollers 114. The second conveyance guide 130 is applied with an urging force for swinging in a direction of an arrow A10 by an unillustrated helical torsion coil spring. However, the urging force is set at such a magnitude that the second conveyance rollers 114 cannot be lifted. Consequently, the second conveyance guide 130 comes into contact with the second joint 125, and the front edge of the second conveyance guide 130 stops at a position lower than the upper guide 107b in the direction A8 perpendicular to the medium conveying direction.

FIG. 11B illustrates a state in which a medium M3 is conveyed between the first conveyance rollers 113 and the second conveyance rollers 114. By the second conveyance rollers 114 being pushed up by the medium M3, the second joint 125 is raised. The second conveyance guide 130 is swung in the direction of the arrow A10 along with the second joint 125 by the urging force of the helical torsion coil spring, and a stopper 130a comes into contact with a contact member 130b. Consequently, the second conveyance guide 130 separates from the second joint 125, and the front edge of the second conveyance guide 130 stops at the same height as the upper guide 107b in the direction A8 perpendicular to the medium conveying direction. By the front edge of the second conveyance guide 130 not moving above the upper guide 107b, an incident of a medium conveyed in a bent state colliding with the front edge of the conveyance guide 116, etc., beyond the upper guide 107b is prevented.

Similarly to the second conveyance guide 130, when a medium is not conveyed between the first conveyance rollers 113 and the second conveyance rollers 114, the second conveyance guides 128 and 129 come into contact with the second shaft 122 and the first joint 123, respectively. On the other hand, when the medium M3 is conveyed between the first conveyance rollers 113 and the second conveyance rollers 114, the second conveyance guides 128 and 129 swing in the direction of the arrow A10 along with the second shaft 122 and the first joint 123, respectively. Thus, the second conveyance guides 128, 129, and 130 are provided to be movable in conjunction with a movement of the second conveyance rollers 114.

The second conveyance guides 128, 129, and 130 prevent a medium conveyed in a bent state from contacting the second shaft 122 and each joint, and prevent the second shaft 122 and each joint from being damaged. Further, the second conveyance guides 128, 129, and 130 move in conjunction with a movement of the second conveyance rollers 114 and therefore can protect the second shaft 122 and each joint even when these parts protrude toward the medium conveyance path. Consequently, a radius of the second conveyance rollers 114 can be made smaller than a height of the medium conveyance path in the medium conveying apparatus 100, and downsizing and weight reduction of the device can be performed.

FIG. 12A, FIG. 12B, FIG. 13A, FIG. 13B, FIG. 14A, FIG. 14B, and FIG. 15 are schematic diagrams for illustrating operations of the second conveyance rollers 114, the conveyance guide 116, and the fourth conveyance rollers 118 when a medium is conveyed.

FIG. 12A, FIG. 12B, FIG. 13A, FIG. 13B, FIG. 14A, FIG. 14B, and FIG. 15 are diagrams of the second conveyance rollers 114, the conveyance guide 116, the fourth conveyance rollers 118, etc., viewed from side. As illustrated in each diagram, the guide part 131a of the conveyance guide 116 includes a slope 131e for coming into contact with a conveyed medium. The slope 131e is provided in such a way as to gradually incline upward with respect to the lower guide 107a being the medium conveyance surface from the second imaging device 115b side toward the second conveyance rollers 114 side. The slope 131e is located in such a way that the lower end of the slope 131e is positioned at the same height as the imaging surface of the second imaging device 115*b* in the direction A8 perpendicular to the medium conveying direction.

Further, the moving member 127 of the second conveyance rollers 114 is provided with an engaged part 127*d* capable of engaging with the engaging member 131*d*. The engaged part 127*d* is an arm.

Further, the fourth conveyance rollers 118 are provided with a moving member 132, and the moving member 132 and the fourth conveyance rollers 118 are located to be movable in the direction A8 perpendicular to the medium conveying direction by a spring 132*a*. However, the fourth conveyance rollers 118 move independently of the conveyance guide 116 and the second conveyance rollers 114.

In the example illustrated in FIG. 12A to FIG. 14B, a conveyed medium M4 is thick paper, a plastic card, a passport, etc., having a predetermined thickness and high stiffness. It is assumed that the thickness of the medium M4 is greater than a distance D1 between the upper end of the slope 131*e* and the medium conveyance surface in the direction A8 perpendicular to the medium conveying direction and less than a distance D2 between the rotation center of the second conveyance roller 114 and the medium conveyance surface.

Figure 12A:
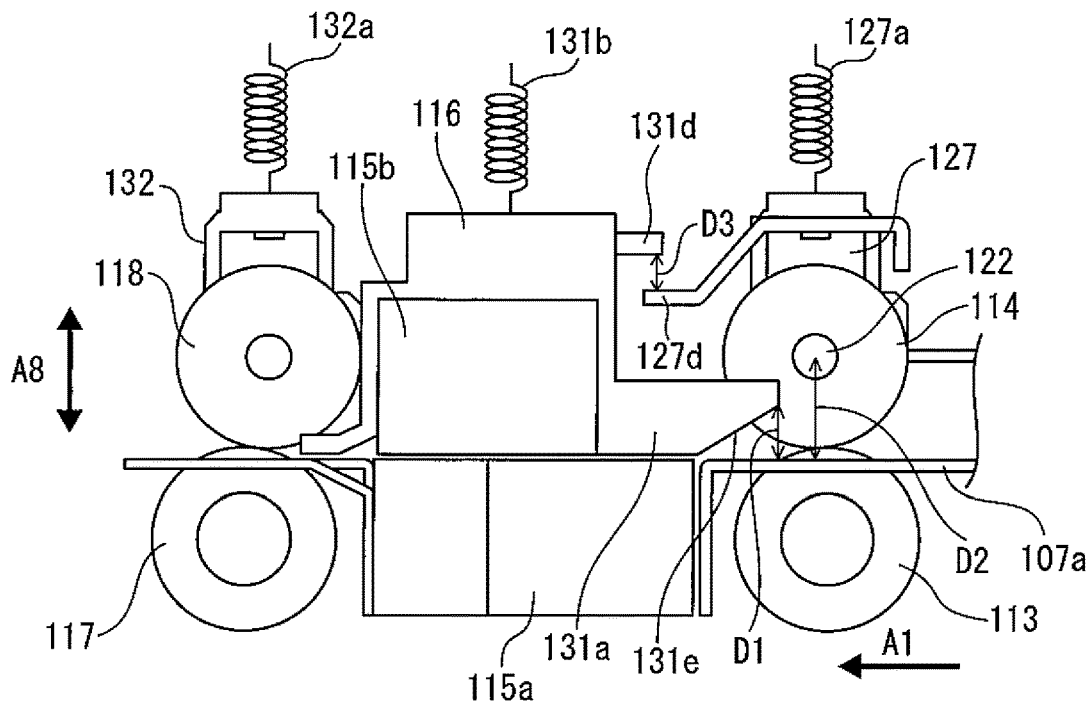
FIG. 12A is a schematic diagram for illustrating an operation when a medium is conveyed.

FIG. 12A illustrates a state in which a medium is not conveyed. As illustrated in FIG. 12A, when a medium is not conveyed, the second conveyance rollers 114 and the fourth conveyance rollers 118 are in contact with the first conveyance rollers 113 and the third conveyance rollers 117, respectively. Further, the conveyance guide 116 supports the second imaging device 115*b* in such a way that a slight gap through which a thin medium can be conveyed exists between the first imaging device 115*a* and the second imaging device 115*b*.

When a medium is not conveyed, the slope 131*e* is located in such a way that the distance D1 between the upper end of the slope 131*e* and the medium conveyance surface in the direction A8 perpendicular to the medium conveying direction is less than the distance D2 between the rotation center of the second conveyance rollers 114 and the medium conveyance surface. Further, when a medium is not conveyed, the engaging member 131*d* and the engaged part 127*d* of the moving member 127 are located to be separate from one another, that is, are configured to be separated at a predetermined distance from one another. The engaging member 131*d* is located in such a way that a distance D3 separating the engaging member 131*d* from the engaged part 127*d* in the direction A8 perpendicular to the medium conveying direction when a medium is not conveyed is less than the distance D1 between the upper end of the slope 131*e* and the medium conveyance surface.

Figure 12B:
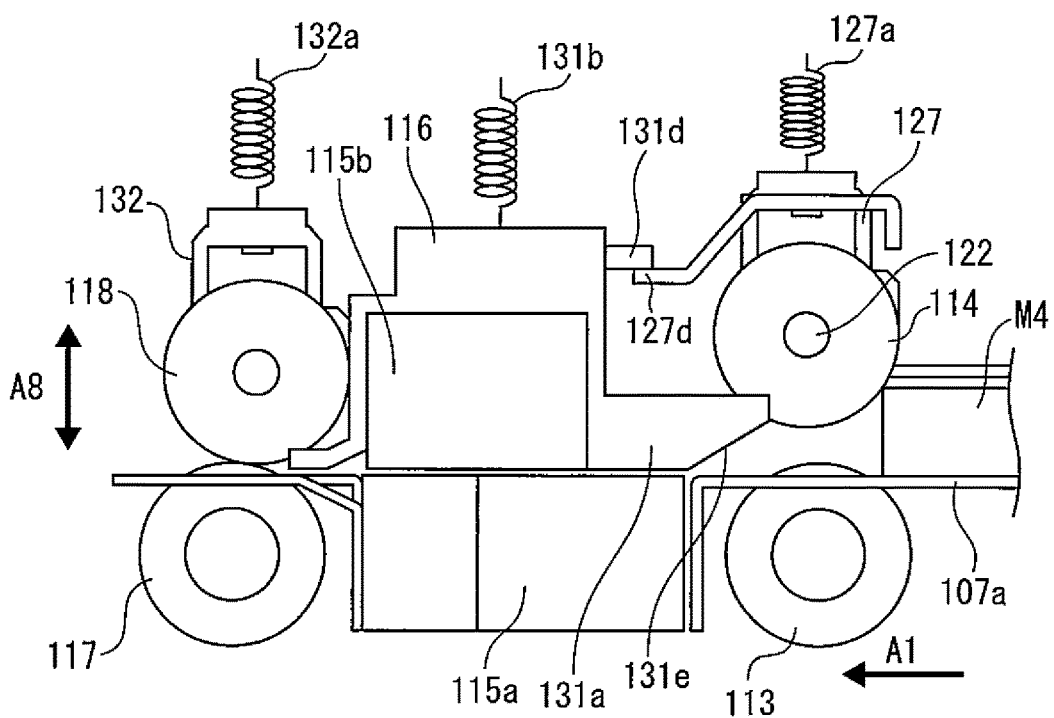
FIG. 12B is a schematic diagram for illustrating the operation when a medium is conveyed.

FIG. 12B illustrates a state in which the medium M4 is conveyed, and the front edge of the medium M4 comes into contact with the second conveyance rollers 114. As illustrated in FIG. 12B, when the front edge of the medium M4 comes into contact with the second conveyance rollers 114, the second conveyance rollers 114 are moved upward (are pushed up) in the direction A8 perpendicular to the medium conveying direction, that is, in a direction moving away from the medium conveyance surface, by the medium M4. The moving member 127 moves in conjunction with the movement of the second conveyance rollers 114, and the engaged part 127*d* of the moving member 127 engages with the engaging member 131*d*.

Figure 13A:
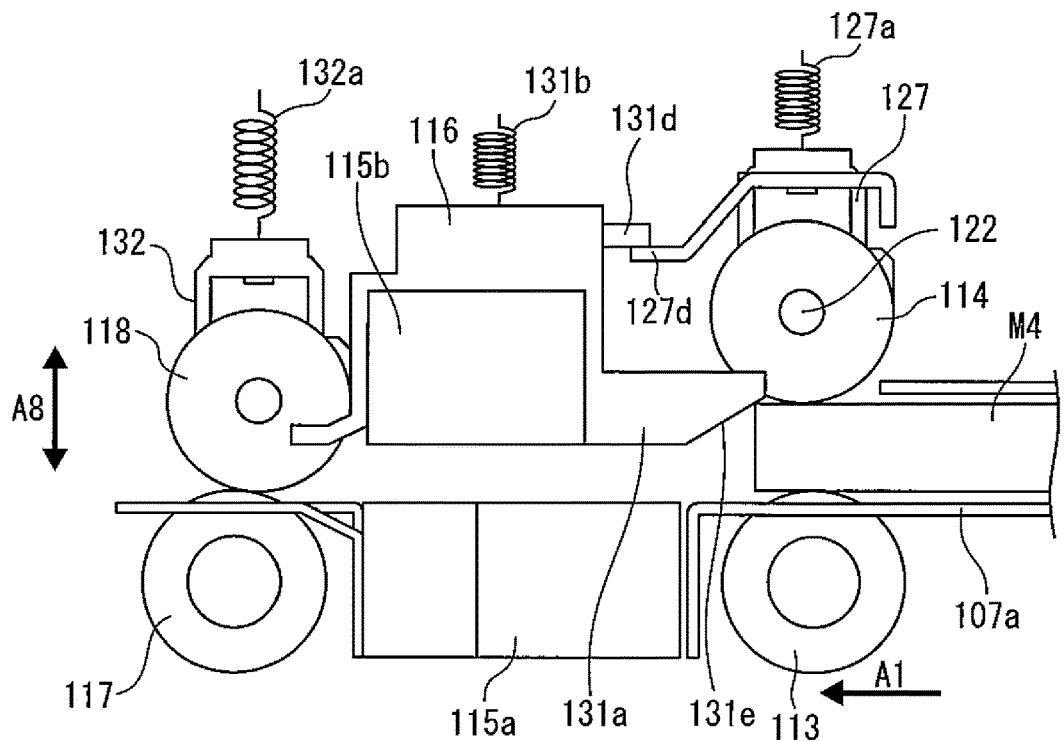
FIG. 13A is a schematic diagram for illustrating the operation when a medium is conveyed.

FIG. 13A illustrates a state in which the medium M4 is further conveyed, and the front edge of the medium M4 comes into contact with the slope 131*e* of the conveyance guide 116. As illustrated in FIG. 13A, when the medium M4 is further conveyed after the front edge of the medium M4 comes into contact with the second conveyance rollers 114, the second conveyance rollers 114 are further moved upward by the medium M4, and the moving member 127 moves further upward in conjunction with the movement of the second conveyance rollers 114. By the engaging member 131*d* engaged with the engaged part 127*d* of the moving member 127 being moved upward by the moving member 127, the conveyance guide 116 moves upward, and the front edge of the medium M4 becomes able come into contact with the slope 131*e* of the conveyance guide 116. Consequently, occurrence of a jam due to the front edge of the medium M4 colliding with the upstream end of the conveyance guide 116 in the medium conveying direction A1 and the medium M4 stopping is suppressed.

Further, the second imaging device 115*b* also moves upward according to the upward movement of the conveyance guide 116. Thus, the moving member 127 moves the second imaging device 115*b* upward in the direction A8 perpendicular to the medium conveying direction.

Figure 13B:
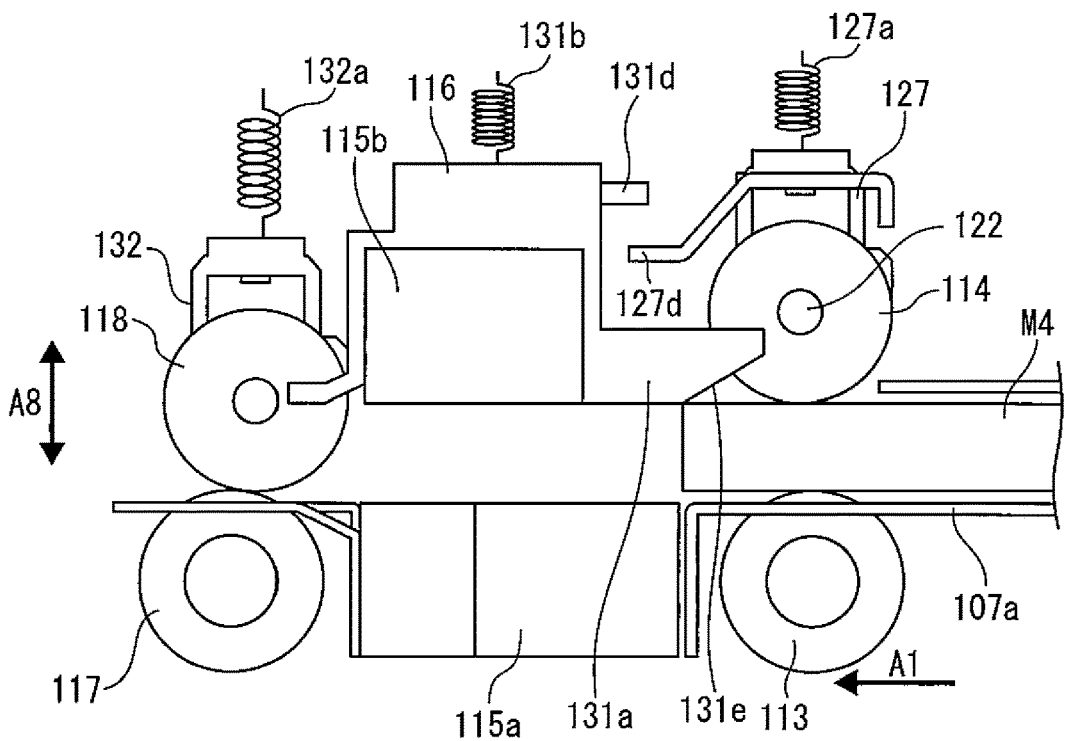
FIG. 13B is a schematic diagram for illustrating the operation when a medium is conveyed.

FIG. 13B illustrates a state in which the medium M4 is further conveyed, and the front edge of the medium M4 comes into contact with the lower end of the slope 131*e* of the conveyance guide 116 positioned at the same height as the imaging surface of the second imaging device 115*b*. As illustrated in FIG. 13B, when the medium M4 is further conveyed after the front edge of the medium M4 comes into contact with the slope 131*e* of the conveyance guide 116, the conveyance guide 116 is further moved upward by the medium M4, and the second imaging device 115*b* also further moves upward accordingly. Thus, by the slope 131*e* coming into contact with the medium M4, the conveyance guide 116 moves the second imaging device 115*b* upward in the direction A8 perpendicular to the medium conveying direction. On the other hand, at this time, the second conveyance rollers 114 do not move from the position illustrated in FIG. 13A, and therefore the engaging member 131*d* separates from the engaged part 127*d* of the moving member 127 again.

Figure 14A:
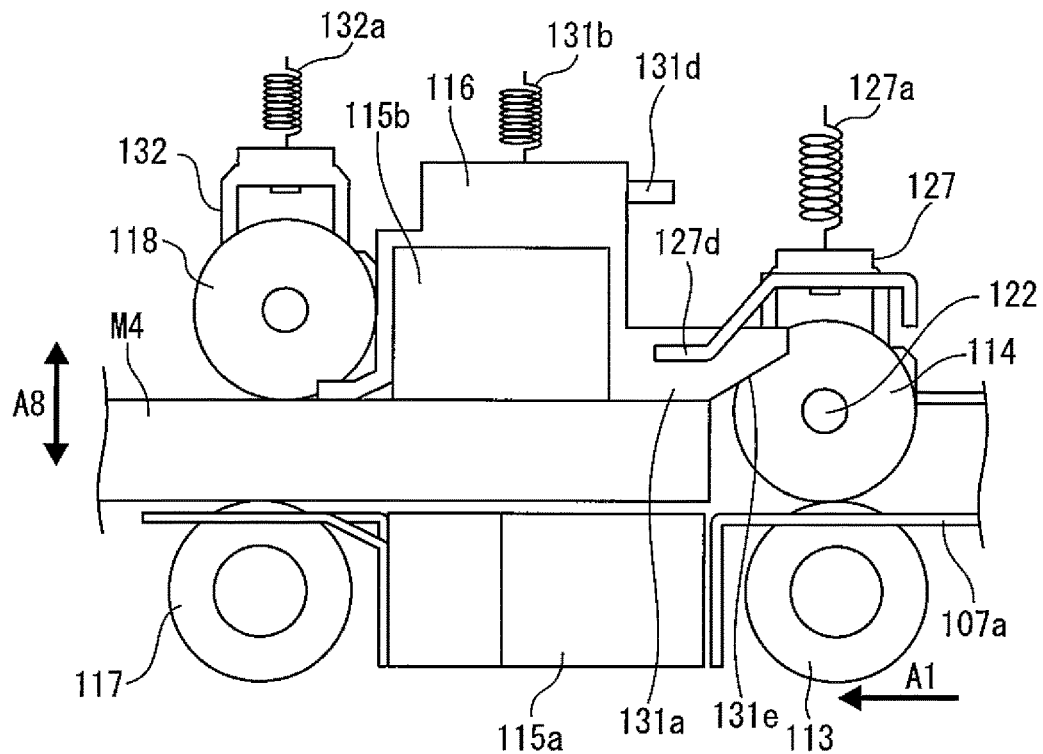
FIG. 14A is a schematic diagram for illustrating the operation when a medium is conveyed.

FIG. 14A illustrates a state in which the medium M4 is further conveyed, and the rear edge of the medium M4 passes the second conveyance rollers 114. As illustrated in FIG. 14A, when the medium M4 comes into contact with the fourth conveyance rollers 118, the fourth conveyance rollers 118 are moved upward (are pushed up) in the direction A8 perpendicular to the medium conveying direction by the medium M4. On the other hand, when the rear edge of the medium M4 passes the second conveyance rollers 114, the second conveyance rollers 114 and the moving member 127 are moved downward in the direction A8 perpendicular to the medium conveying direction, that is, in a direction approaching the medium conveyance surface, by the springs 127*a* and self-weights. As described above, an end of the guide part 131*a* on the second conveyance rollers 114 side is located more toward the second imaging device 115*b* side than the second shaft 122 of the second conveyance rollers 114 and an end of each joint on the conveyance guide 116 side. Consequently, the guide part 131*a* may move in the direction A8 perpendicular to the medium conveying direction, without contacting the second shaft 122 or each joint.

Figure 14B:
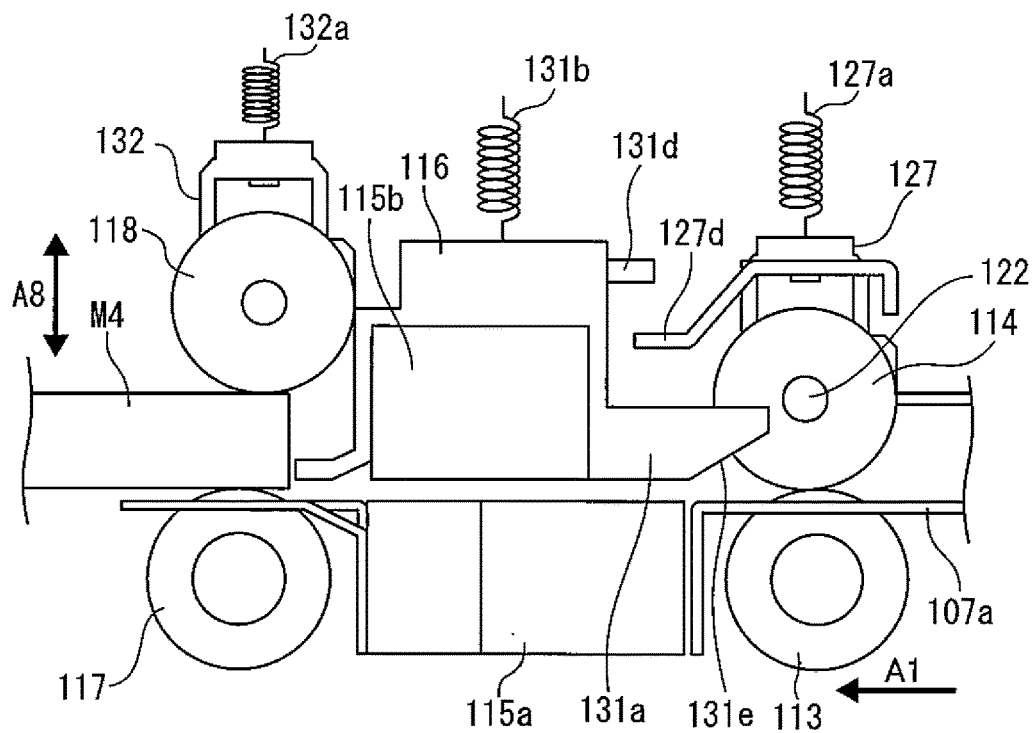
FIG. 14B is a schematic diagram for illustrating the operation when a medium is conveyed.

FIG. 14B illustrates a state in which the medium M4 is further conveyed, and the rear edge of the medium M4 passes the second imaging device 115*b*. As illustrated in FIG. 14B, when the rear edge of the medium M4 passes the second imaging device 115*b*, the conveyance guide 116 and the second imaging device 115*b* are moved downward in the direction A8 perpendicular to the medium conveying direction by the spring 131b and self-weights.

Figure 15:
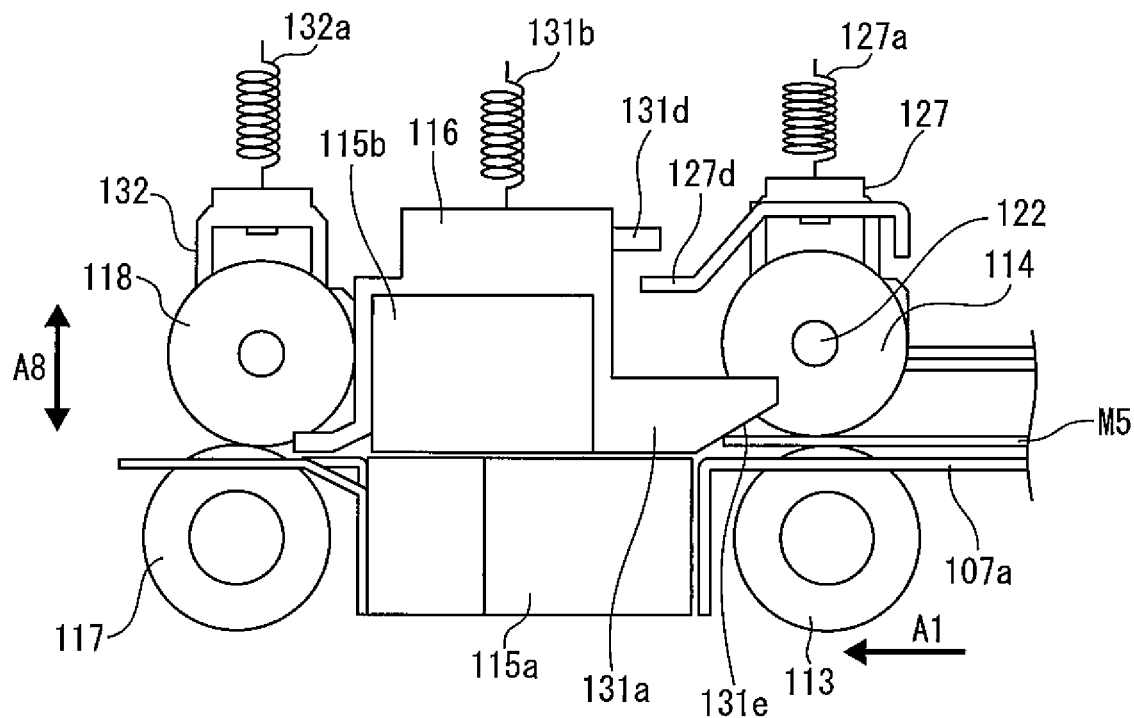
FIG. 15 is a schematic diagram for illustrating the operation when a medium is conveyed.

FIG. 15 illustrates a state in which a thin medium M5 is conveyed, and the front edge of the medium M5 comes into contact with the slope 131e of the conveyance guide 116. The thickness of the medium M5 is less than the distance D3 separating the engaging member 131d from the engaged part 127d of the moving member 127 in the direction A8 perpendicular to the medium conveying direction when a medium is not conveyed. As illustrated in FIG. 15, the second conveyance rollers 114 are moved upward in the direction A8 perpendicular to the medium conveying direction by the medium M5. However, since the thickness of the conveyed medium M5 is less than the distance D3, the engaged part 127d of the moving member 127 does not engage with the engaging member 131d, and the moving member 127 does not move the engaging member 131d and the second imaging device 115b. Thus, only when a medium with a predetermined thickness or greater is conveyed, that is, only when the conveyed medium has a thickness greater than the predetermined distance, the moving member 127 moves the second imaging device 115b by engaging with the engaging member 131d.

A technical meaning of raising the second imaging device 115b will be described below in two stages, one when a medium comes into contact with the second conveyance rollers 114 and the other when the medium comes into contact with the slope 131e.

When a tilt of the slope 131e in the conveyance guide 116 against the medium conveyance surface is too large, a collision load when a conveyed medium comes into contact with the slope 131e increases; and therefore the medium cannot lift the conveyance guide 116, and a medium jam may occur. Further, when the size of the slope 131e is too large, the conveyance guide 116 contacts the second shaft 122 of the second conveyance rollers 114 or each joint. When the roller diameter of the second conveyance roller 114 or a distance between the second conveyance rollers 114 and the second imaging device 115b is increased in order to prevent the conveyance guide 116 from contacting the second shaft 122, etc., a size of the entire medium conveying apparatus 100 increases. Further, in that case, a distance between the second conveyance rollers 114 and the fourth conveyance rollers 118 also increases, and a minimum size of a medium that can be conveyed by the medium conveying apparatus 100 in the medium conveying direction A1 (the subscanning direction) also increases. Accordingly, the distance D1 between the upper end of the slope 131e and the medium conveyance surface is restricted.

Assuming that the conveyance guide 116 is not raised by the second conveyance rollers 114, when a medium having a thickness greater than the distance D1 between the upper end of the slope 131e and the medium conveyance surface is conveyed, the medium does not come into contact with the slope 131e. Consequently, the medium cannot lift the conveyance guide 116, and a medium jam may occur.

As described above, in the medium conveying apparatus 100, the slope 131e is located in such a way that the distance D1 between the upper end of the slope 131e and the medium conveyance surface is less than the distance D2 between the rotation center of the second conveyance rollers 114 and the medium conveyance surface. In other words, the distance D2 is longer than the distance D1. Accordingly, as long as the thickness of a conveyed medium is less than the distance D2, even when the thickness is greater than the distance D1, the medium raises the second conveyance rollers 114 before reaching the conveyance guide 116, and the second conveyance rollers 114 raises the conveyance guide 116. Consequently, the medium can come into contact with the slope 131e of the conveyance guide 116 when reaching the conveyance guide 116, raise the conveyance guide 116, and pass between the first imaging device 115a and the second imaging device 115b.

Further, since a large tilt of the slope 131e against the medium conveyance surface in the conveyance guide 116 is not required, the medium conveying apparatus 100 can suppress occurrence of a medium jam. Further, since a large-sized slope 131e of the conveyance guide 116 is not required, the medium conveying apparatus 100 can suppress increase in the size of the entire medium conveying apparatus 100 and suppress increase in a minimum size of a medium that can be conveyed by the medium conveying apparatus 100.

Further, in the medium conveying apparatus 100, the engaging member 131d is located in such a way that the distance D3 separating the engaging member 131d from the engaged part 127d when a medium is not conveyed is less than the distance D1 between the upper end of the slope 131e and the medium conveyance surface. A conveyed medium raises the second conveyance rollers 114 and the engaged part 127d by the thickness of the medium, and therefore when the thickness of the medium is greater than the distance D1, the engaged part 127d can reliably engage with the engaging member 131d and raise the conveyance guide 116. Consequently, when reaching the conveyance guide 116, the medium can come into contact with the slope 131e of the conveyance guide 116, raise the conveyance guide 116, and pass between the first imaging device 115a and the second imaging device 115b.

Further, when the second imaging device 115b excessively rises and moves away from a surface of a medium, a position of the surface of the medium may go out of depth of field of the image sensor on the second imaging device 115b, and an imaged image may be out of focus. Assuming that the engaging member 131d is engaged with the engaged part 127d in a state in which a medium is not conveyed, a distance between the first imaging device 115a and the second imaging device 115b extends by the thickness of a medium existing between the first conveyance rollers 113 and the second conveyance rollers 114. For example, thicknesses of two pages of an opened passport with a binding part in between differ. Assuming that the thinner page is positioned between the first imaging device 115a and the second imaging device 115b, and the thicker page is positioned between the first conveyance rollers 113 and the second conveyance rollers 114, a position of a surface of the thinner page may go out of the depth of field of the second imaging device 115b.

As described above, in the medium conveying apparatus 100, the engaging member 131d and the engaged part 127d are located in such a way as not to be engaged with one another and to be separated by the distance D3, when a medium is not conveyed. Consequently, even when a medium a thickness of which varies by position, such as an opened passport, is conveyed, the second imaging device 115b reliably contacts a surface of the medium as long as the difference in thickness within the medium is less than or equal to the distance D3. Accordingly, even when a medium a thickness of which varies by position is conveyed, the medium conveying apparatus 100 can satisfactorily keep a distance between the image sensor on the second imaging device 115b and a surface of the medium, and prevent an imaged image from becoming out of focus.

Similarly, when the fourth conveyance rollers 118 move along with the conveyance guide 116 in the direction A8 perpendicular to the medium conveying direction, the distance between the first imaging device 115a and the second imaging device 115b extends by the thickness of a medium existing between the third conveyance rollers 117 and the fourth conveyance rollers 118. Assuming that a thinner page is positioned between the first imaging device 115a and the second imaging device 115b, and a thicker page is positioned between the third conveyance rollers 117 and the fourth conveyance rollers 118, a position of a surface of the thinner page may go out of the depth of field of the second imaging device 115b.

As described above, in the medium conveying apparatus 100, the fourth conveyance rollers 118 move independently of the conveyance guide 116 and the second conveyance rollers 114 in the direction A8 perpendicular to the medium conveying direction. Consequently, even when a medium a thickness of which varies by position, such as an opened passport, is conveyed, the second imaging device 115b reliably contacts a surface of the medium. Accordingly, even when a medium a thickness of which varies by position is conveyed, the medium conveying apparatus 100 can satisfactorily keep a distance between the image sensor on the second imaging device 115b and the surface of the medium, and prevent an imaged image from becoming out of focus.

Figure 16:
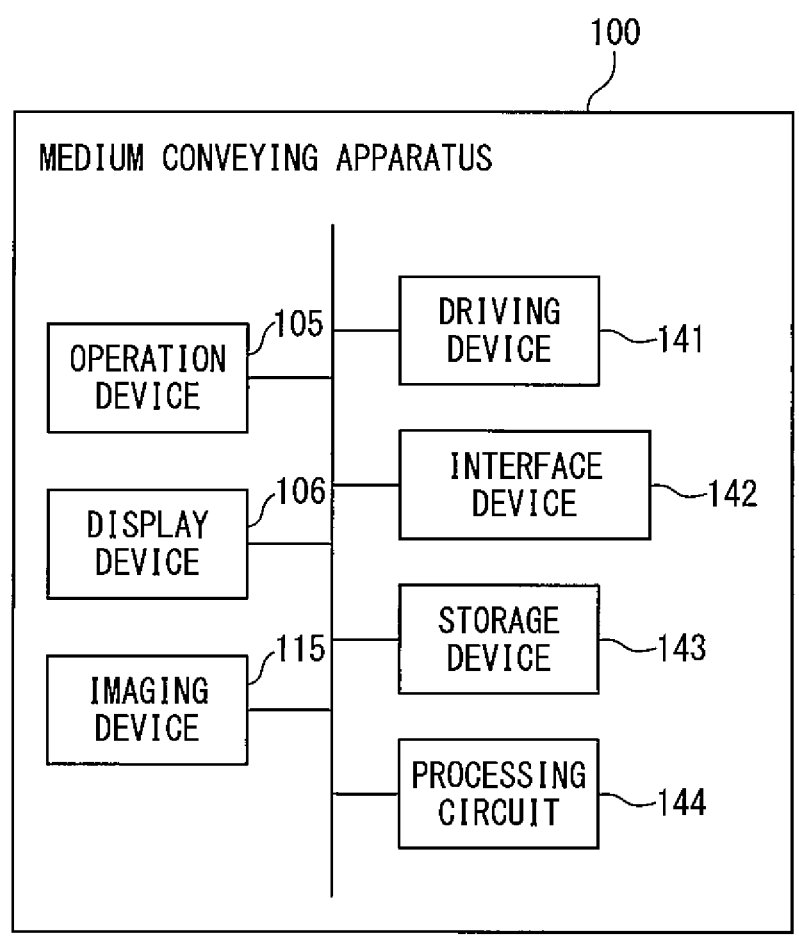
FIG. 16 is a block diagram illustrating a schematic configuration of the medium conveying apparatus 100.

FIG. 16 is a block diagram illustrating a schematic configuration of the medium conveying apparatus 100.

The medium conveying apparatus 100 further includes a driving device 141, an interface device 142, a storage device 143, and a processing circuit 144, etc., in addition to the configuration described above.

The driving device 141 is an example of a driving force generation module. The driving device 141 includes one or a plurality of motors, and conveys a medium by rotating the feed rollers 111, the retard rollers 112, and the first to fourth conveyance rollers 113, 114, 117, and 118, by a control signal from the processing circuit 144. Particularly, the driving device 141 rotates the third shaft 124 to rotate the first joint 123, the second shaft 122, the second joint 125 and the fourth shaft 126 and rotate the second conveyance rollers 114.

For example, the interface device 142 includes an interface circuit conforming to a serial bus such as universal serial bus (USB), is electrically connected to an unillustrated information processing device (for example, a personal computer or a mobile information terminal), and transmits and receives an input image and various types of information. Further, a communication module including an antenna transmitting and receiving wireless signals, and a wireless communication interface device for transmitting and receiving signals through a wireless communication line in conformance with a predetermined communication protocol may be used in place of the interface device 142. For example, the predetermined communication protocol is a wireless local area network (LAN).

The storage device 143 includes a memory device such as a random access memory (RAM) or a read only memory (ROM), a fixed disk device such as a hard disk, or a portable storage device such as a flexible disk or an optical disk. Further, the storage device 143 stores a computer program, a database, a table, etc., used for various types of processing in the medium conveying apparatus 100. The computer program may be installed on the storage device 143 from a computer-readable, non-transitory medium such as a compact disk read only memory (CD-ROM), a digital versatile disk read only memory (DVD-ROM), etc., by using a well-known setup program, etc.

For example, the processing circuit 144 is a processor, such as a central processing unit (CPU). The processing circuit 144 operates in accordance with a program previously stored in the storage device 143. The processing circuit 144 may be a digital signal processor (DSP), a large scale integration (LSI), an application specific integrated circuit (ASIC), a field-programmable gate array (FPGA), etc.

The processing circuit 144 is connected to the operation device 105, the display device 106, the imaging devices 115, the driving device 141, the interface device 142, the storage device 143, etc., and controls each of these units. The processing circuit 144 performs drive control of the driving device 141, imaging control of the imaging devices 121, etc., acquires an image, and transmits the image to an unillustrated information processing device through the interface device 142.

As described in detail above, in the medium conveying apparatus 100, a drive shaft connected to a joint is located at an intermediate position between a position where the second conveyance rollers 114 are in contact with the first conveyance rollers 113 and a first position where the second conveyance rollers 114 separates most from the first conveyance rollers 113 in the vertical direction. Consequently, even when a medium having a predetermined thickness is conveyed, the joint shafts 123c and 125c do not separate from the first receiving members 123a and 125a, or the second receiving members 123b and 125b. Further, the columnar parts of the joint shafts 123c and 125c do not contact the first receiving members 123a and 125a, or the second receiving members 123b and 125b. Furthermore, the medium does not contact the joint shafts 123c and 125c.

Further, a distance between the first position where the second conveyance rollers 114 separates most from the first conveyance rollers 113 in the vertical direction and the intermediate position of the second receiving member 123b is greater than the radius on cross section of the second conveyance rollers 114 in the vertical direction. Consequently, the medium conveying apparatus 100 can convey a medium having a thickness sufficiently greater than the radius of the second conveyance roller 114 while performing downsizing and weight reduction of the device by sufficiently reducing a size of the second conveyance roller 114. Accordingly, the medium conveying apparatus 100 can satisfactorily convey a thicker medium.

Further, in the medium conveying apparatus 100, when a medium with a predetermined thickness or greater is conveyed, the moving member 127 engages with the engaging member 131d in conjunction with a movement of the second conveyance rollers 114 and moves the conveyance guide 116 and the second imaging device 115b. Consequently, when media with various thicknesses are conveyed, the medium conveying apparatus 100 can suitably move the second imaging device 115b and satisfactorily image the conveyed media.

Figure 17:
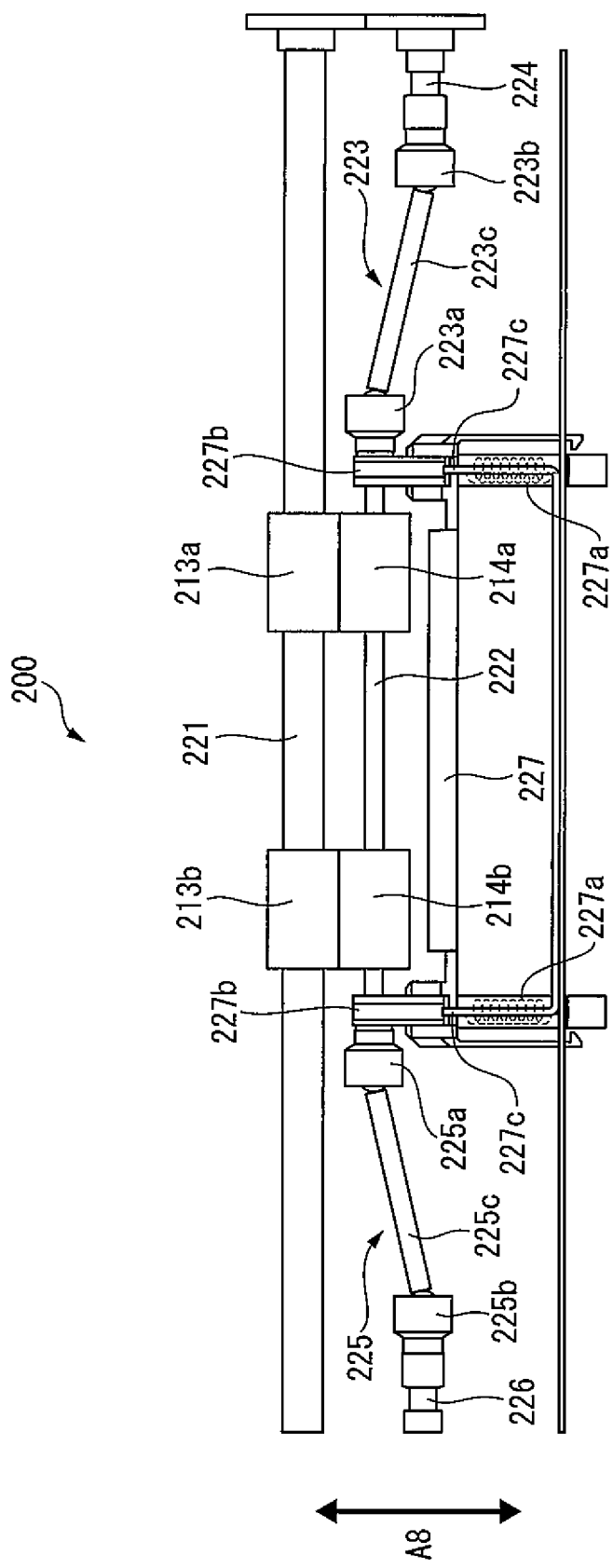
FIG. 17 is a schematic diagram for illustrating a positional relation of other second conveyance rollers 214, etc.
Figure 18:
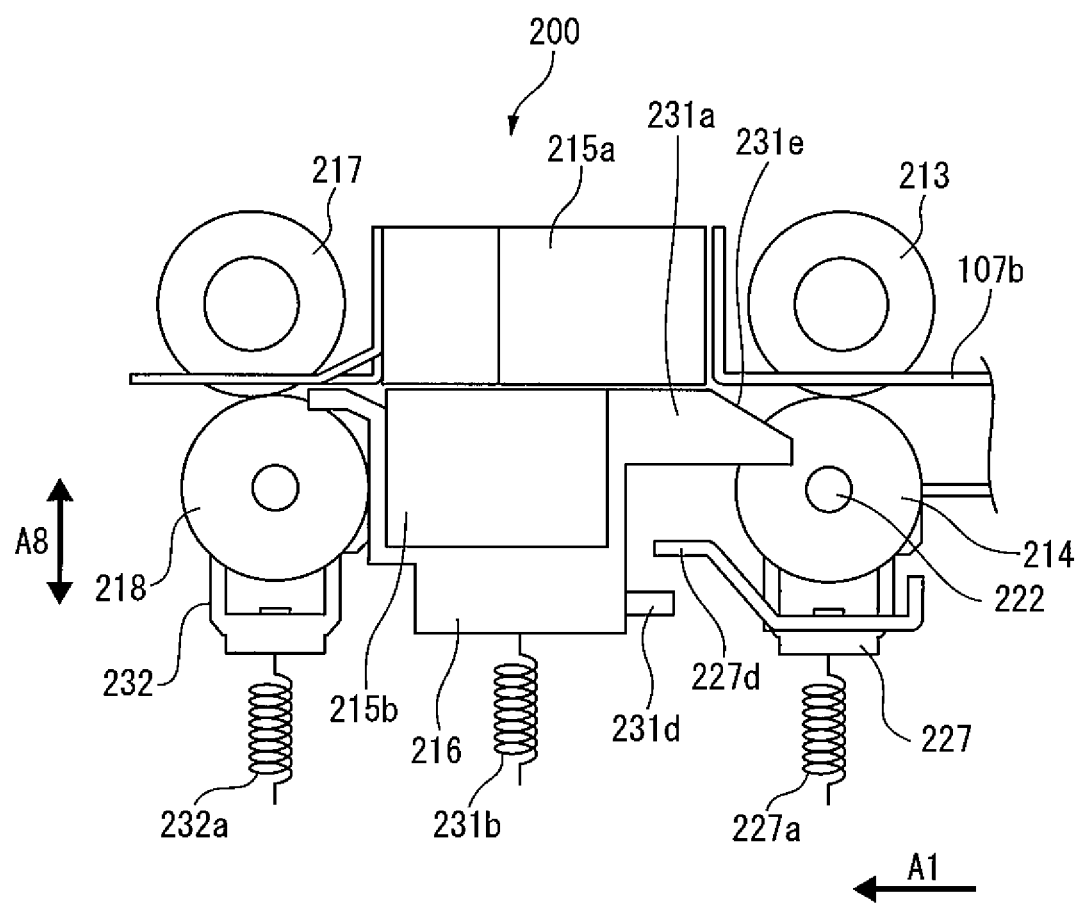
FIG. 18 is a schematic diagram for illustrating a positional relation of the other second conveyance rollers 214, etc.

FIG. 17 is a schematic diagram for illustrating a positional relation of first conveyance rollers 213 and second conveyance rollers 214 in a medium conveying apparatus 200 according to another embodiment. Further, FIG. 18 is a schematic diagram for illustrating a positional relation of the second conveyance rollers 214, a conveyance guide 216, and fourth conveyance rollers 218 in the medium conveying apparatus 200.

In the medium conveying apparatus 200, first to fourth conveyance rollers, imaging devices, and conveyance guides are located in a reversed manner across a medium conveyance path with respect to the corresponding parts in the medium conveying apparatus 100, in a direction A8 perpendicular to a medium conveying direction. Specifically, in the medium conveying apparatus 200, the second conveyance rollers 214 are located below the first conveyance rollers 213, a second imaging device 215b is located below a first imaging device 215a, and the fourth conveyance rollers 218 are located below third conveyance rollers 217.

Similarly to the medium conveying apparatus 100, the first conveyance rollers 213 are provided with a first shaft 221, etc. Further, the second conveyance rollers 214 are provided with a second shaft 222, a first joint 223, a third shaft 224, a second joint 225, a fourth shaft 226, a moving member 227, springs 227a, groove parts 227b, plate members 227c, engaged parts 227d, etc. The first joint 223 includes a first receiving member 223a, a second receiving member 223b, and a joint shaft 223c, and the second joint 225 includes a first receiving member 225a, a second receiving member 225b, and a joint shaft 225c. Further, the conveyance guide 216 is provided with a guide part 231a, springs 231b, an engaging member 231d, slopes 231e, etc., and the fourth conveyance rollers 218 are provided with a moving member 232, a spring 232a, etc. When a medium with a predetermined thickness or greater is conveyed in the medium conveying apparatus 200, the second conveyance rollers 214, the second imaging device 215b, the conveyance guide 216, and the fourth conveyance rollers 218 move downward in the direction A8 perpendicular to the medium conveying direction.

As described in detail above, the medium conveying apparatus 200 can satisfactorily convey a thicker medium.

Further, when media with various thicknesses are conveyed, the medium conveying apparatus 200 can suitably move the second imaging device 215b and satisfactorily image the conveyed media.

According to this embodiment, the medium conveying apparatus can suitably move an imaging device and satisfactorily image the conveyed media when media with various thicknesses are conveyed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A medium conveying apparatus comprising:
   an imaging device, arranged to be movable in a direction perpendicular to a medium conveying direction, for imaging a medium;
   a roller arranged to be movable in the direction perpendicular to the medium conveying direction, on an upstream side of the imaging device in the medium conveying direction;
   a conveyance guide including a slope for coming into contact with a medium;
   an engaging member; and
   a moving member provided on a shaft of the roller to move in conjunction with a movement of the roller and move the imaging device by engaging with the engaging member, wherein
   the engaging member and the moving member are arranged to be separate from one another when a medium is not conveyed, and wherein the moving member moves the imaging device by engaging with the engaging member only when a medium with a predetermined thickness is conveyed.

2. The medium conveying apparatus according to claim 1, wherein
   the conveyance guide is integrally provided with the imaging device in such a way as to protrude toward the roller side, and
   the conveyance guide moves the imaging device by the slope coming into contact with a medium.

3. The medium conveying apparatus according to claim 1, wherein the engaging member is arranged in such a way that a distance separating the engaging member from the moving member when a medium is not conveyed is less than a distance between an upper end of the slope and a medium conveyance surface in the direction perpendicular to the medium conveying direction.

4. The medium conveying apparatus according to claim 1, wherein the slope is arranged in such a way that a distance between an upper end of the slope and a medium conveyance surface is less than a distance between a rotation center of the roller and the medium conveyance surface in the direction perpendicular to the medium conveying direction.

5. The medium conveying apparatus according to claim 1, wherein an end of the conveyance guide on the roller side is arranged more toward the imaging device side than a rotation axis of the roller in the medium conveying direction.

6. A medium conveying apparatus comprising:
   an imaging device, arranged to be movable in a direction perpendicular to a medium conveying direction, for imaging a medium;
   a roller arranged to be movable in the direction perpendicular to the medium conveying direction, on an upstream side of the imaging device in the medium conveying direction;
   a conveyance guide including a slope for coming into contact with a medium;
   an engaging member; and
   a moving member for moving in conjunction with a movement of the roller and moving the imaging device by engaging with the engaging member, wherein
   the engaging member and the moving member are arranged to be separate from one another when a medium is not conveyed, wherein the moving member moves the imaging device by engaging with the engaging member only when a medium with a predetermined thickness is conveyed, and wherein
   the engaging member is arranged in such a way that a distance separating the engaging member from the moving member when a medium is not conveyed is less than a distance between an upper end of the slope and a medium conveyance surface in the direction perpendicular to the medium conveying direction.

7. A medium conveying apparatus comprising:
   an imaging device, arranged to be movable in a direction perpendicular to a medium conveying direction, for imaging a medium;

a roller arranged to be movable in the direction perpendicular to the medium conveying direction, on an upstream side of the imaging device in the medium conveying direction;

a conveyance guide including a slope for coming into contact with a medium;

an engaging member; and a moving member for moving in conjunction with a movement of the roller and moving the imaging device by engaging with the engaging member, wherein the engaging member and the moving member are arranged to be separate from one another when a medium is not conveyed, wherein the moving member moves the imaging device by engaging with the engaging member only when a medium with a predetermined thickness is conveyed, and wherein the slope is arranged in such a way that a distance between an upper end of the slope and a medium conveyance surface is less than a distance between a rotation center of the roller and the medium conveyance surface in the direction perpendicular to the medium conveying direction.

* * * * *